(12) United States Patent
Kroger et al.

(10) Patent No.: US 7,209,869 B1
(45) Date of Patent: Apr. 24, 2007

(54) METHOD AND SYSTEM FOR RESOURCE REQUIREMENT PLANNING AND GENERATING A PRODUCTION SCHEDULE USING A UNIFORM DATA MODEL

(75) Inventors: Udo Kroger, Hamburg (DE); Eckhard Monke, Langwedel (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/786,440

(22) PCT Filed: Aug. 31, 1999

(86) PCT No.: PCT/EP99/06389

§ 371 (c)(1),
(2), (4) Date: May 3, 2001

(87) PCT Pub. No.: WO00/13115

PCT Pub. Date: Mar. 9, 2000

Related U.S. Application Data

(60) Provisional application No. 60/098,788, filed on Sep. 1, 1998.

(51) Int. Cl.
*G06F 17/50* (2006.01)
*G06Q 99/00* (2006.01)

(52) U.S. Cl. .................. 703/1; 703/6; 703/7; 703/8; 705/29

(58) Field of Classification Search .............. 703/1, 703/6, 7, 8; 715/751; 706/47, 48, 50; 705/29
See application file for complete search history.

(56) References Cited

U.S. PATENT DOCUMENTS 4,700,317 A * 10/1987 Watanabe et al. ............ 706/45

(Continued)

FOREIGN PATENT DOCUMENTS

| EP | 0520923 A2 | 12/1992 |
|---|---|---|
| GB | 2311154 A | 9/1997 |
| GB | 2325066 A | 11/1998 |

OTHER PUBLICATIONS

Robert W. Sebesta, Concepts of Programming Languages, 1999, Addison Wesley Longman, Inc., 4th edition, pp. 105-125.*

Virginia E. Barker and Dennis E. O'Conner, "Expert Systems For Configuration At Digital: XCON and Beyond", 1989, Communications of the ACM, vol. 32 No. 3, pp. 298-318.*

(Continued)

*Primary Examiner*—Paul Rodriguez
*Assistant Examiner*—Jason Proctor
(74) *Attorney, Agent, or Firm*—Darby & Darby

(57) ABSTRACT

A method for representing the structure of an article of manufacture having a plurality of design variants includes defining a plurality of positions corresponding to different predefined locations on the article of manufacture and assigning at least one variant to each position. Each variant identifies a specific part that may be used in the respective position or a specific type of connection between a pair of parts. In any given position, at most one part or connection variant can be selected. Code rules are defined for each variant which indicate when a particular variant should be used in accordance with specified design options. The position and variant representation can be implemented as part of a bill of materials used for manufacturing resource planning. Improved methods for defining the code rules, for evaluating the code rules in the bill of materials to determine manufacturing parts requirements for a plurality of orders, and for generating documentation for manufactured variants of the article are also disclosed.

3 Claims, 29 Drawing Sheets

U.S. PATENT DOCUMENTS

| | | | | |
|---|---|---|---|---|
| 4,831,546 | A | * | 5/1989 | Mitsuta et al. ................. 703/1 |
| 4,847,761 | A | * | 7/1989 | Ferriter et al. ................ 705/29 |
| 4,939,668 | A | * | 7/1990 | Brown et al. ................. 706/59 |
| 5,216,612 | A | * | 6/1993 | Cornett et al. ................ 700/96 |
| 5,295,067 | A | * | 3/1994 | Cho et al. ..................... 705/29 |
| 5,311,424 | A | * | 5/1994 | Mukherjee et al. ........... 705/29 |
| 5,329,464 | A | * | 7/1994 | Sumic et al. .................. 703/1 |
| 5,598,511 | A | * | 1/1997 | Petrinjak et al. .............. 706/50 |
| 5,777,877 | A | | 7/1998 | Beppu et al. .......... 364/468.03 |
| 5,796,614 | A | * | 8/1998 | Yamada ...................... 700/106 |
| 5,806,069 | A | * | 9/1998 | Wakiyama et al. ......... 707/102 |
| 5,960,422 | A | * | 9/1999 | Prasad ........................... 707/2 |
| 6,002,854 | A | * | 12/1999 | Lynch et al. ................... 703/1 |
| 6,216,109 | B1 | * | 4/2001 | Zweben et al. ................ 705/8 |
| 6,314,422 | B1 | * | 11/2001 | Barker et al. ................. 707/10 |

OTHER PUBLICATIONS

Görel Hedin, Lennart Ohlsson, and John McKenna; "Product Configuration Using Object Oriented Grammars"; Jul. 1998; Springer-Verlag; pp. 107-126.*

*Object-Oriented Design for Real-Time Manufacturing Control and Analysis*, IBM Technical Disclosure Bulletin, U.S., IBM Corp. New York, vol. 36, No. 63, Jun. 1993.

*User-Directed Rules Checking*, IBM Technical Disclosure Bulletin, U.S., IBM Corp. New York, vol. 36, No. 6A, Jun. 1993.

Hurt, J., *A Taxonomy of CAD/CAE Systems*, Manufacturing Review, US, American Society of Mechanical Engineers, New York, vol. 2, No. 3, Sep. 1989.

* cited by examiner

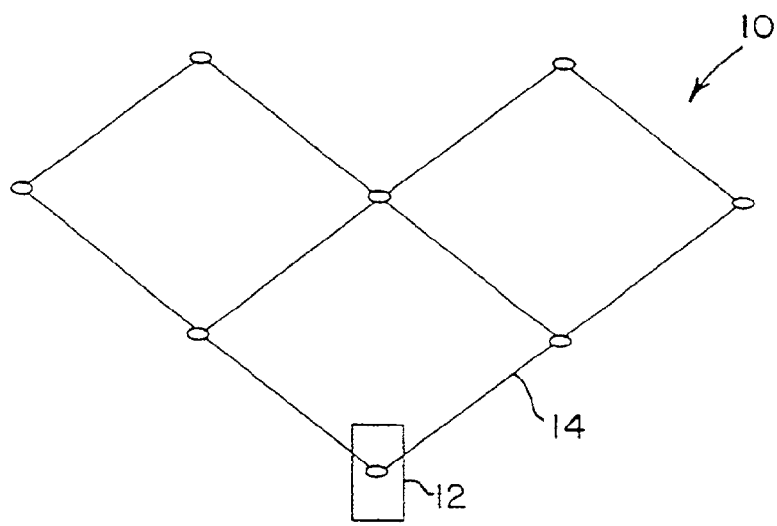
FIG. 1
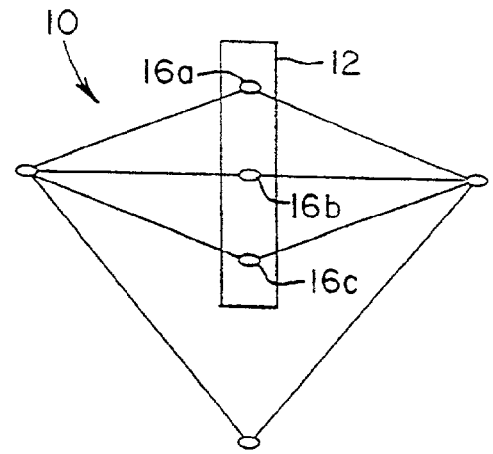
FIG. 2
FIG. 3
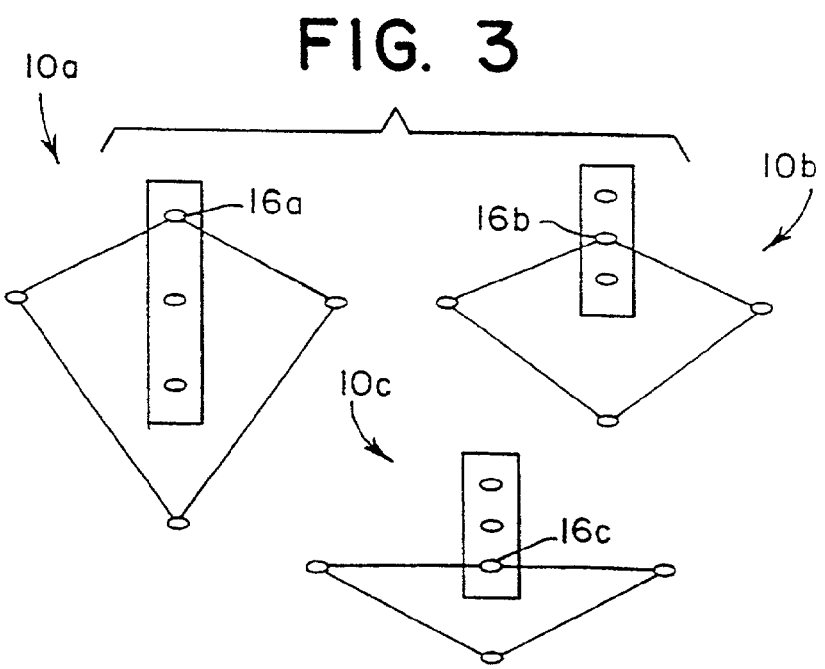

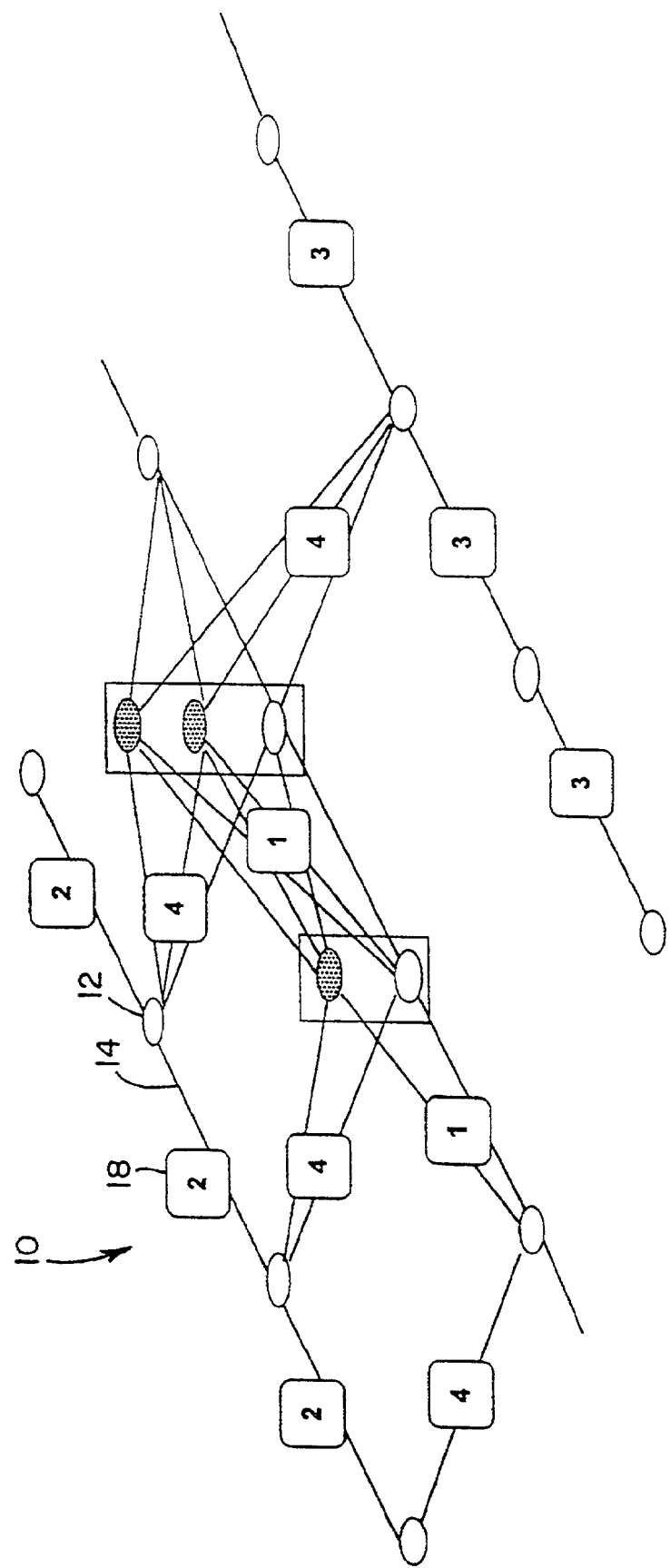

FIG. 11
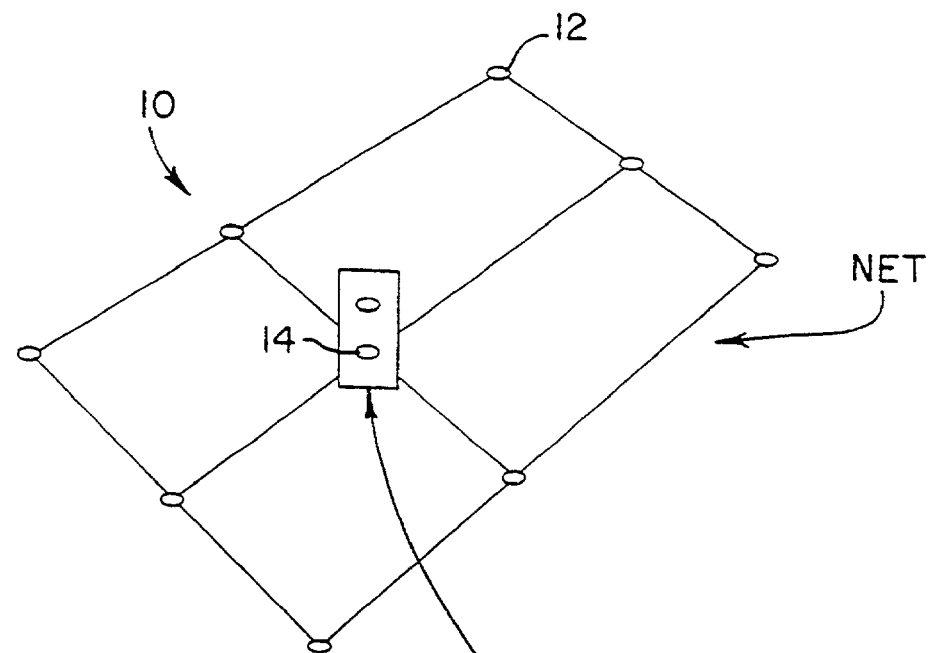
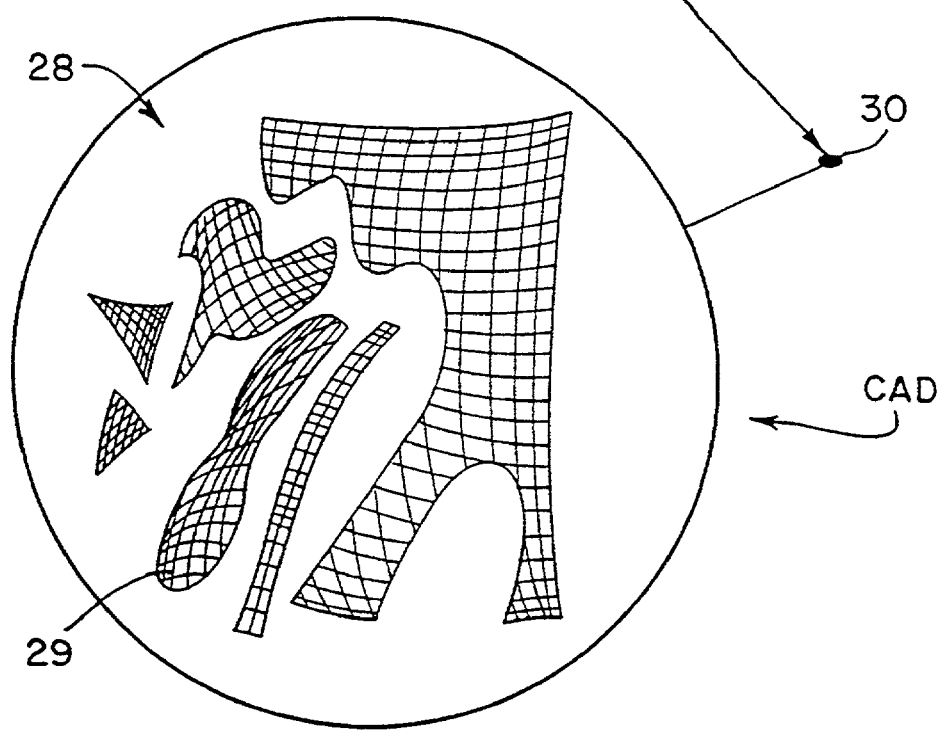

FIG. 12a

| TYPE | POSITION | POSV/VARIANT | PART | PART_NAME | CODE/CODERUE |
|---|---|---|---|---|---|
| TOP | 10 16 04 0100 | 0010 | A2404607507 | LENKRAD | Standard |
| TOP | 10 16 04 0100 | 0015 | A2024600207 | LENKRAD | M117•956; |
| TOP | 10 16 04 0100 | 0020 | A2404604007 | LENKRAD | 280+955; |
| TOP | 10 16 04 0100 | 0030 | A2404604807 | LENKRAD | 289•955; |
| TOP | 10 16 04 0100 | 0030 | A2704600007 | ZB LENKRAD | 956+906 |
| TOP | 10 16 04 0100 | 0060 | A2704600207 | LENKRAD | Standard |
| TOP | 10 16 08 0100 | 0010 | A2404602298 | AIRBAG | 289; |
| TOP | 10 16 08 0100 | 0030 | A2404602798 | AIRBAG | 956; |
| TOP | 10 16 08 0100 | 0040 | A2704600498 | AIRBAG | M117•956; |
| TOP | 10 16 08 0100 | 0060 | A2704602498 | ZB AIRBAG | M117•494•956; |
| TOP | 10 16 08 0100 | 0070 | A2704602298 | | |
| TOP | 10 16 12 0200 | 0010 | A2684600249 | KONTAKTSPIRALE | Standard |

FIG. 12b

| A | | | | A |
|---|---|---|---|---|
| TOP | 10 16 12 0800 | 0001 | A2269900722 | SENKSCHRAUBE | Standard |
| TOP | 10 16 16 0100 | 0010 | A2024600020 | LENKG.KUPPLG | M104+M111+M604+M605+M611; |
| TOP | 10 16 16 0100 | 0020 | A2024600220 | LU LENKUNGSKUPPLUNG | M112+MM17; |
| TOP | 10 16 16 0100 | 0010 | A2209900604 | SICHERUNGSSCHRAUBE | M112+M117; |
| TOP | 10 16 16 0400 | 0010 | A2409900792 | KAEFIGMUTTER | M112+M117; |
| TOP | 10 16 16 0440 | 0008 | A2084600726 | MANTELROHR VST | Standard |
| TOP | 10 16 20 0100 | 0009 | A2024602926 | MANTELROHR VST | M112+M117; |
| TOP | 10 16 20 0100 | 0013 | A2024607226 | LU MANTELROHR VST | M111•719; |
| TOP | 10 16 20 0100 | 0014 | A2024602726 | MANTELROHR VST | 441; |
| TOP | 10 16 20 0100 | 0016 | A2024607026 | ZB GRIFF | (M112+M117)•441; |
| TOP | 10 16 24 2300 | 0001 | A2404620269 | GRIFF | 441; |
| TOP | 10 16 24 2560 | 0001 | A2024660278 | SCHUTZBLECH | Standard |

| CODE | BEN | 1 | 2 | 3 | 4 | 5 | 6 | 7 | 8 | 9 |
|---|---|---|---|---|---|---|---|---|---|---|
| M113 | Turbo Diesel | 1 | | | | | | | 1 | 1 |
| M136 | 4 Cylinder | | 1 | | | | | 1 | | |
| M154 | 6 Cylinder | | | 1 | | | | 1 | | |
| M172 | 8 Cylinder | | | | 1 | 1 | | | | |
| 200A | Leather interior | 1 | 1 | 1 | 1 | 1 | | 1 | | 1 |
| 221 | Power front seat left | 1 | 1 | 1 | 1 | 1 | 1 | | 1 | |
| 222 | Power front seat right | | | | | | | | | |
| 240 | Ext. temp gauge | | | | | | | | | |
| 245 | Trip computer | 1 | 1 | 1 | 1 | | | | | |
| 248 | Child seats/fold down table | | | | | | | | | |
| 249 | Auto dim rear view mirror | | | | | | | | | |
| 257 | Radio, Hi-Line | | | | | | | | | |
| 259 | Radio, premium w/ Bose syste | | | | | | | | | |
| 280 | Leather steering wheel/gearshift | 1 | 1 | 1 | 1 | | | | | |
| 292 | Side airbag | | | | | | | | | |
| 414 | Electric sunroof | | 1 | | | 1 | | | | |
| 417 | Lamelle sunroof | | | | | | | | | |
| 423 | Automatic transmission | | | | | | | | | |
| 472 | Electronic Stability Program | | | | | | | 1 | | |
| 494 | USA | | | | | | | | | |
| 498 | Japan | | | | | | | | | |
| 550 | Trailer hitch | | | | | | | | | |
| 551 | Alarm | 1 | 1 | 1 | 1 | | | | | |
| 580 | Air conditioning | | | | | | | 1 | 1 | 1 | 1 |
| 625 | Australia | | | | | | | | | |
| 660 | Alloy wheels 6.5" 225x75x16 | | | | | | | | | |
| 661 | Alloy wheels 8" 255x65x16 | | | | | | | | | |
| 662 | Alloy wheels 8.5" 275x55x17 | | | | | | | | | |
| 682 | Fire extinguisher | | | | | | | | | |
| 731 | Wood interior | | | | | | | | | |
| 819 | CD changer | | | | | | | | | |
| 840 | Dark glass | | | | | | | | | |
| 847 | 3rd row seats | 1 | | 1 | | | | 1 | 1 | 1 | 1 |
| 848 | Electric rear qtr windows | | | | | | | | | |
| 849 | External mounted spare tire | | | | | | | | | |
| 873 | Heated front seats | 1 | | 1 | | | | 1 | 1 | 1 | 1 |
| 887 | Lockable safe box | | | | | | | | | |

OPTIONS → ORDERS

FIG. 17

| CODE RULE ID | CODE RULE | ORDERS | | | | |
|---|---|---|---|---|---|---|
| | | 1 | 2 | 3 | ... | n |
| 1 | CR1 | 1 | 0 | 0 | | 1 |
| 2 | CR2 | 0 | 0 | 1 | | 0 |
| 3 | CR3 | 0 | 1 | 0 | | 0 |
| 4 | CR4 | 0 | 1 | 1 | | 0 |
| 5 | CR5 | 1 | 0 | 0 | | 1 |

FIG. 18

| POS | POSV | CODE RULE | CODE RULE ID | PART | ORDERS | | | | |
|---|---|---|---|---|---|---|---|---|---|
| | | | | | 1 | 2 | 3 | ... | n |
| 1000 | 01 | CR1 | 1 | A1 | 1 | 0 | 0 | | 1 |
| 1000 | 02 | CR2 | 2 | A2 | 0 | 0 | 1 | | 0 |
| 1000 | 03 | CR3 | 3 | A3 | 0 | 1 | 0 | | 0 |
| 1001 | 01 | CR1 | 1 | B1 | 1 | 0 | 0 | | 1 |
| 1001 | 02 | CR4 | 4 | B2 | 0 | 1 | 1 | | 0 |
| 1002 | 01 | CR2 | 2 | C1 | 0 | 0 | 8 | | 0 |
| 1002 | 02 | CR3 | 3 | C2 | 0 | 8 | 0 | | 0 |
| 1002 | 03 | CR5 | 5 | C3 | 8 | 0 | 0 | | 8 |

FIG. 19a

| KGU | POS | VAR | PART | VENDOR | CVI | USAGECODE | 1 | 2 | 3 | 4 | 5 | 6 | 7 | 8 | 9 |
|---|---|---|---|---|---|---|---|---|---|---|---|---|---|---|---|
| 695 | 260050 | 06 | A163 820 07 0 | Johnson Controls I | 23000 | 245·551·(M113+M136+M154) | 1 | | | | | | | | |
| 542 | 100020 | 02 | A163 540 01 1 | Johnson Controls I | 23500 | 245·551·M154 | | | 1 | | | | | | |
| 600 | 040110 | 01 | A163 600 00 1 | | 31500 | 414·(M113+M136+M154)+417 | | 1 | | | | | | | |
| 540 | 030020 | 01 | A163 540 02 1 | | 10500 | (245+551)·M154 | 1 | 1 | | | | | | | |
| 260 | 030105 | 01 | A202 267 04 1 | | 28000 | 280·(M113+M136+M154) | 1 | 1 | 1 | | | | | | |
| 546 | 220100 | 02 | A163 540 25 0 | Packard Electric | 12000 | (472·M154)+M172 | | | | 1 | 1 | 1 | | | |
| 546 | 140200 | 02 | A163 540 33 0 | Packard Electric | 48500 | 580·(M113+M136+M154) | | | | 1 | | 1 | 1 | 1 | 1 |
| 266 | 240030 | 02 | A210 267 01 1 | Eldra | 28500 | 280·423·(M113+M136) | 1 | 1 | | | | | | | |
| 460 | 030100 | 01 | A163 460 02 0 | | 28000 | 280·(M113+M136+M154) | 1 | 1 | 1 | | | | | | |
| 913 | 040050 | 08 | A163 910 11 3 | Johnson Controls I | 17500 | 200A·873·(M113+M136+M154) | 1 | | 1 | | | | 1 | | 1 |

FIG. 19b

| | 12 | 16 | 102 | 170 | | 104 | | | 171 | | | | | | | | A → |
|---|---|---|---|---|---|---|---|---|---|---|---|---|---|---|---|---|---|
| 913 | 040050 | 06 | A 163 910 08 3 | Johnson Controls I | 18500 | 221·873·(M113+M136+M154) | | | | | – | – | | | – | – | |
| 913 | 040080 | 08 | A 163 910 12 3 | Johnson controls I | 17500 | 200A·873·(M113+M136+M154) | | | | | – | – | | | – | – | |
| 546 | 20010 | 05 | A 163 540 36 0 | Delphi | 48500 | 580·(M113+M136+M154) | | | | | – | – | | | | | |
| 833 | 080150 | 01 | A 163 830 03 3 | Delphi | 15500 | M113 | | | | | | | | | | | |
| 695 | 050050 | 07 | A 163 690 08 5 | Johnson Controls I | 24000 | 245·847·(M113+M136+M154) | | | | – | – | – | | | | | |
| 695 | 050050 | 08 | A 163 690 09 5 | Johnson Controls I | 22000 | 245·414·847·(M113+M136+M154) | | | | | | | – | | | | |
| 545 | 100015 | 01 | N 072581 0003 | Kostal of America, I | 48500 | 580·(M113+M136+M154) | | | | | | | | | – | | |
| 546 | 240100 | 03 | A 163 540 22 0 | Packard Electric | 10000 | (245+551)·(M113+M136+M154)·41 4+1 | | | | | – | – | | | | | |

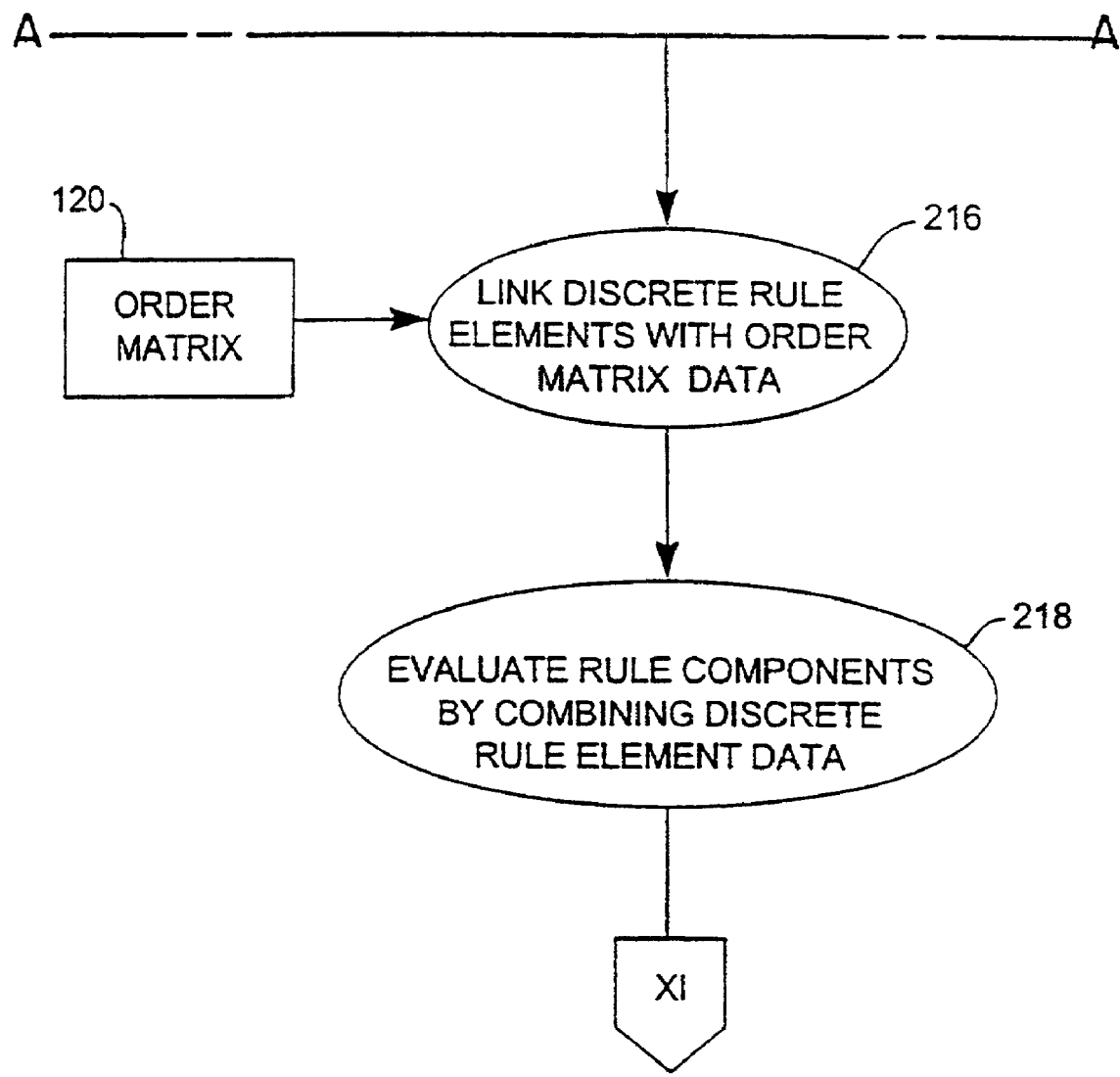

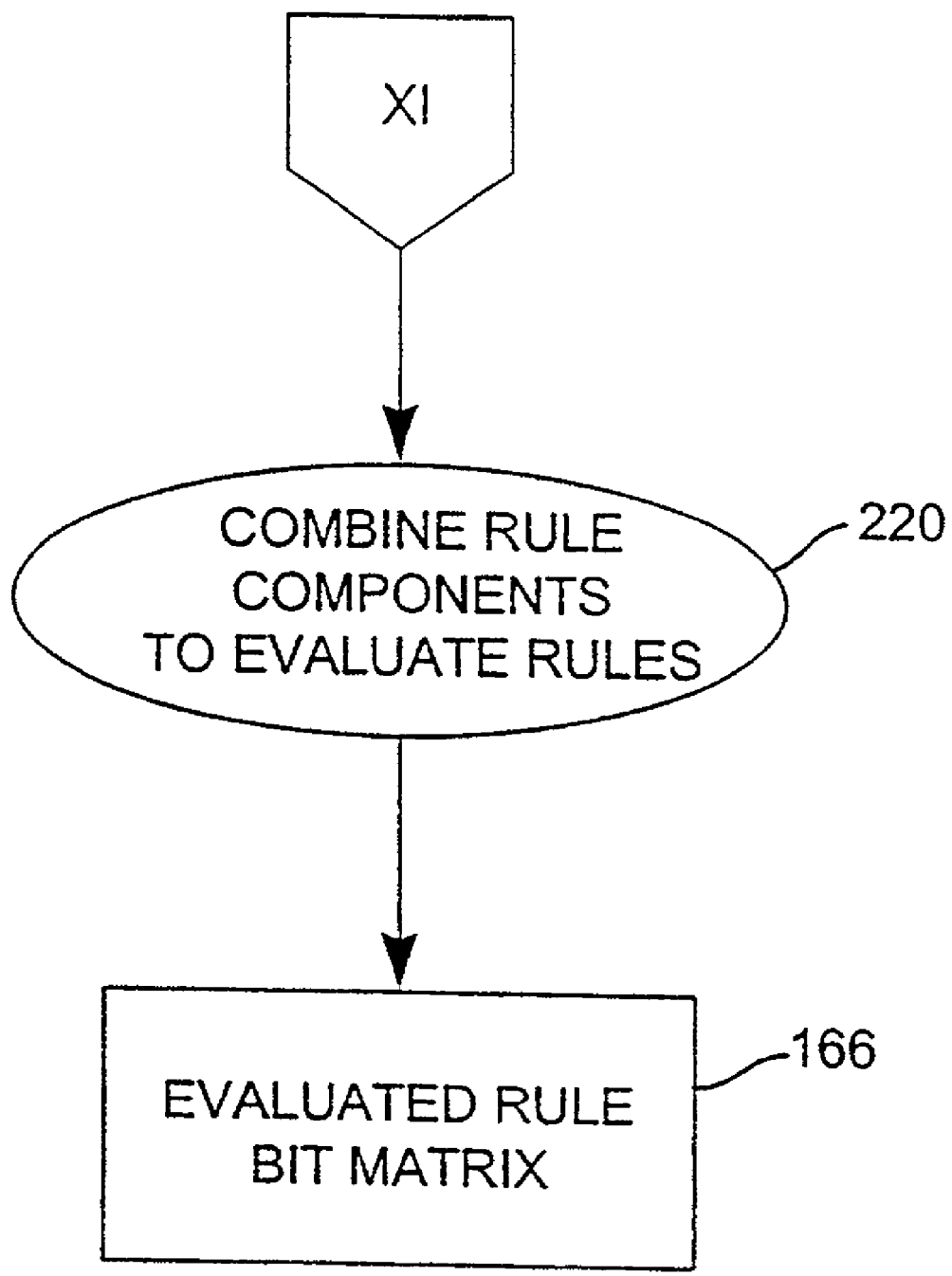

FIG. 23

| CODE RULE ID | CV2 | CV3 | CLASS | CODE RULE |
|---|---|---|---|---|
| 10500 | | | | (245+551)·M154 |
| 12000 | | | | (472·M154)+M172 |
| 17500 | | | | 200A·873·(M113+M136+M154) |
| 18500 | | | | 221·873·(M113+M136+M154) |

FIG. 24

| CODE RULE ID | CV2 | CV3 | CLASS | CODE RULE |
|---|---|---|---|---|
| 10500 | 0 | | C | (245+551) · M154 |
| 10500 | 1 | | V | 245 · M154 |
| 10500 | 2 | | V | 551 · M154 |
| 12000 | 0 | | C | (472 · M154)+M172 |
| 12000 | 1 | | V | 472 · M154 |
| 12000 | 2 | | V | M172 |
| 17500 | 0 | | C | 200A · 873 · (M113+M136+M154) |
| 17500 | 1 | | V | 200A · 873 · M113 |
| 17500 | 2 | | V | 200A · 873 · M136 |
| 17500 | 3 | | V | 200A · 873 · M154 |
| 18500 | 0 | | C | 221 · 873 · (M113+M136+M154) |
| 18500 | 1 | | V | 221 · 873 · M113 |
| 18500 | 2 | | V | 221 · 873 · M136 |
| 18500 | 3 | | V | 221 · 873 · M154 |

FIG. 25a

| CODE RULE ID | CV2 | CV3 | CLASS | CODE RULE |
|---|---|---|---|---|
| 10500 | 0 | 0 | C | (245+551)·M154 |
| 10500 | 1 | 0 | V | 245·M154 |
| 10500 | 1 | 1 | A | 245 |
| 10500 | 1 | 2 | A | M154 |
| 10500 | 2 | 0 | V | 551·M154 |
| 10500 | 2 | 1 | A | 551 |
| 10500 | 2 | 2 | A | M154 |
| 12000 | 0 | 0 | C | (472·M154)+M172 |
| 12000 | 1 | 1 | V | 472·M154 |
| 12000 | 1 | 1 | A | 472 |
| 12000 | 2 | 1 | A | M154 |
| 12000 | 2 | 2 | V | M172 |
| 12000 | 2 | 1 | A | 172 |
| 17500 | 0 | 0 | C | 200A·873·(M113+M136+M154) |
| 17500 | 1 | 0 | V | 200A·873·M113 |
| 17500 | 1 | 1 | A | 200A |
| 17500 | 1 | 2 | A | 873 |
| 17500 | 2 | 2 | A | M113 |
| 17500 | 2 | 0 | V | 200A·873·M136 |
| 17500 | 2 | 1 | A | 200A |
| 17500 | 2 | 2 | A | 873 |
| 17500 | 3 | 3 | A | MA36 |
| 17500 | 3 | 0 | V | 200A·873·M154 |
| 17500 | 3 | 1 | A | 200A |
| 17500 | 3 | 2 | A | 873 |
| 17500 | 3 | 3 | V | M154 |

FIG. 25b

| | | | | |
|---|---|---|---|---|
| 18500 | 0 | 0 | C | 221·873·(M113+M136+M154) |
| 18500 | 1 | 0 | V | 221·873·M113 |
| 18500 | 1 | 1 | A | 221 |
| 18500 | 1 | 2 | A | 873 |
| 18500 | 1 | 3 | A | M113 |
| 18500 | 2 | 0 | V | 221·873·M136 |
| 18500 | 2 | 1 | A | 221 |
| 18500 | 2 | 2 | A | 873 |
| 18500 | 2 | 3 | A | M136 |
| 18500 | 3 | 0 | V | 221·873·M154 |
| 18500 | 3 | 1 | A | 221 |
| 18500 | 3 | 2 | A | 873 |
| 18500 | 3 | 3 | A | M154 |

| CODE RULE ID | CV2 | CV3 | CLASS | CODE RULE | 1 | 2 | 3 | 4 | 5 | 6 | 7 | 8 | 9 |
|---|---|---|---|---|---|---|---|---|---|---|---|---|---|
| 10500 | 0 | 0 | C | (245+551)·M154 | 0 | 0 | 1 | 0 | 0 | 0 | 0 | 0 | 0 |
| 10500 | 1 | 0 | V | 245·M154 | 1 | 1 | ② | 1 | 0 | 1 | 0 | 0 | 0 |
| 10500 | 1 | 1 | A | 245 | 1 | 1 | 1 | 1 | 0 | 0 | 0 | 0 | 0 |
| 10500 | 1 | 2 | A | M154 | 0 | 0 | 1 | 0 | 0 | 1 | 0 | 0 | 0 |
| 10500 | 2 | 0 | V | 551·M154 | 1 | 1 | ② | 1 | 0 | 1 | 0 | 0 | 0 |
| 10500 | 2 | 1 | A | 551 | 1 | 1 | 1 | 1 | 0 | 0 | 0 | 0 | 0 |
| 10500 | 2 | 2 | A | M154 | 0 | 0 | 1 | 0 | 0 | 1 | 0 | 0 | 0 |

METHOD AND SYSTEM FOR RESOURCE REQUIREMENT PLANNING AND GENERATING A PRODUCTION SCHEDULE USING A UNIFORM DATA MODEL

RELATED APPLICATIONS

The present application is a U.S. National Stage Application of International Application No. PCT/EP99/06389, filed Aug. 31, 1999, and claims the benefit of U.S. Provisional Application Ser. No. 60/098,788 entitled "Method and System for Resource Requirement Planning for Generating a Production Schedule Using a Uniform Data Model", filed on Sep. 1, 1998, the contents of which are incorporated herein by reference.

FIELD OF THE INVENTION

This invention is related to a system and method for managing resource, assembly, and documentation requirements for manufacture of an article of manufacture which has a large number of design or component variations.

BACKGROUND OF THE INVENTION

Products which are made of many different parts and subassemblies, such as automobiles, trucks, boats, airplanes, etc. are typically built and assembled in a factory using mass-production assembly techniques. In order to produce a large volume of items, the amount of each type of part which is required for each item must be determined. When only one product design is permitted, the material production requirements can be determined simply by multiplying the requirements for one item by the number of items to be produced. However, when the product to be produced is available in a variety of designs, each of which has different parts, determining the production requirements for a set of product orders becomes more difficult. This is particularly true for products, such as automobiles, which have a large number of parts, are produced in high volumes, and are often marketed with a large variety of different features and options that must be installed at the factory, such as engine type, transmission, and the like.

A manufacturing resource planning ("MRP") system is used to process and track information related to manufacturing, marketing, costs, part and spare part requirements, and other aspects of the production, sale, and maintenance of an article. In a conventional MRP system of the tape used in the mass production of automobiles, the parts requirements of a standard version of the product are detailed in a list or table called a bill of materials ("BOM"). To introduce each new design variation (e.g. an automatic transmission instead of a standard transmission), an auxiliary BOM is generated which details the parts which must be added to the standard BOM to produce the variation, as well as the parts which must be removed from the standard BOM. Because design variations selected in combination may affect the parts requirements in ways which differ from inclusion of the variations separately, additional auxiliary BOMs are also often required to adjust the original and adjusted part requirements.

To calculate the manufacturing parts requirements for a car produced with the new option, the parts requirements specified in the standard BOM and one or more auxiliary BOMs are combined using an add-subtract process wherein the parts detailed in the appropriate auxiliary BOMs are added to and subtracted from the part requirements detailed in the standard BOM. Logical rules which can be evaluated in accordance with customer order options are defined and are used to select which of the many auxiliary BOMs should be combined with the primary BOM for a particular customer order. While effective for designs with a small number of options, when more than a small number of design variations are available, the various BOMs and associated documentation quickly become very complex and difficult to process.

In an alternative representation, every part used in all of the defined variants is included in a single BOM. Each part has an associated construction code rule which indicates when the part should be included. The construction code rules for all valid design variations are typically defined at the same time. The code rules which are entered can be very complicated because they must be defined in such a way that code rules for alternate variations do not "overlap" each other or have other logical ambiguities or inconsistencies.

The difficulty of defining code rules is further complicated when new design variants are added after the initial design is defined because a given code rule for one particular variation can be dependent on which other variations are permitted. In addition to defining a new code rule when a new design variation is added, one or more other, previously generated rules may also need to be updated. This can be a complex and error-prone task because conventional systems do not provide an easy mechanism to identify which code rules may be affected.

In addition to defining one or more BOMs, extensive design documentation must be prepared. Documentation is necessary both for making decisions about the cost, production and delivery time, capacity restrictions, connecting processes. etc. which result from including a variant in the customized product, and also to ensure that information about all the parts used in each product produced is available for historic analysis—i.e. for recalls, analysis in the event of product failure, etc. Conventional systems document each module or subassembly variant from the "top-down", wherein all possible combinations of variants are separately documented. For example, a car design may include a seat assembly which can have one of three types of material (e.g., cloth, leather, vinyl), two adjustment mechanisms (manual or power), and two heat options (none, or heated seat). There are therefore 3*2*2=12 possible combinations of seat assemblies. In the conventional top-down design method, each of the twelve seat assembly variants is documented separately.

It is apparent that as the number of design variants increases, the amount of documentation required increases exponentially. When product assemblies have a large number of options, it becomes practically impossible to document every variant. In a particular truck design, for example, the total number of possible wiring harness configurations (which depends on a large number of factors, including not only the electronic components used, but also the relative position of the components) can be on the order of $2^{63}$ (about $10^{19}$). Because it is practically impossible to document every design variation, a manufacturer must predict which design variations or combinations of options are likely to be the most popular with customers, document only those variations, and then prevent the customer from ordering other non-documented option combinations. This prediction can be both under inclusive, omitting options which may be popular with customers, and over inclusive, including options which are at best, only infrequently ordered.

In addition to the difficulties associated with defining code rules and documenting numerous design variations, a further drawback to conventional MRP systems is the time required to analyze customer orders and to generate information about what parts are required to manufacture the set of orders, when they are needed, and where the parts must be on the assembly line. Conventional systems determine part totals by evaluating, for each customer order, every code rule in the BOM. When a "hit" occurs (i.e., an evaluated code rule is true and thus the part will be used), a data item is written to an output record in a computer data file. This process is repeated for every customer order being considered.

A typical BOM for a luxury automobile can include 70,000 separate part/rule entries. Each part entry has an associated code rule which must be evaluated to determine whether the part should be included in a given build according to the selected customer options. In a typical example, about 4000 particular rules are likely to be true for a given customer order and processing a single order may take up to several minutes. Thus, for a production run of 8000 cars, it is not unusual for the MRP process to take a considerable amount of time to process and to result in a parts requirement file on the order of 10 gigabytes in size, which file does not include process information. Even if the MRP system utilizes parallel processing to evaluate multiple customer orders simultaneously, the process can still take several hours to complete. Because of the file size and duration of the process, conventional MRP systems are operated as batch routines. In addition, the long time needed for the analysis prevents production line managers and others from making rapid changes in the sequence customer orders are filled, because the effect of those changes cannot be calculated quickly enough.

Since many factories now operate on the "just-in-time" and "real-time" principles, where parts required for production are delivered to the factory shortly before or as they are needed, the slowness of current MRP systems can have a significant impact on a factory's profitability. If the production line cannot respond quickly to temporary shortages in parts or delayed deliveries, the resultant slow-downs or shut-down of the production line can directly affect the profitability of the factory.

Accordingly, it is an object of the invention to provide a process for defining and managing the part, part variant, part connection, and part connection variant details related to the manufacture of an article in a simple and compact manner.

It is a further object of the invention to provide a process for use in preparing a BOM which fully describes the part requirements for all variants of a given product design while avoiding the exponential growth of auxiliary BOMs and variant documentation as new design variants are introduced.

Another object of the invention is to provide a method and system for more quickly evaluating the code rules in a BOM to determine the manufacturing parts requirements and other information in accordance with one or more customer orders.

Yet a further object of the invention is to provide a resource and requirement planning system and method in which process and activity data relating to the physical and/or functional connections between parts can be tracked.

SUMMARY OF THE INVENTION

When an article is manufactured, every part, of necessity, occupies a unique physical location in the article. When plural design variations exist, the specific part used in a given location can depend on the particular variation being built. According to one aspect of the invention, the design of an article of manufacture with a large number of variations, such as an automobile, is represented as a tree or net of positions which, in the aggregate, represents the structure of all possible variants of the article. Each position corresponds to a part location in an actual article and has one or more associated variants which define the possible parts that can be placed in the corresponding part location when a particular article is actually built. The specific part used depends on the design variation being assembled. Each variant in the net is assigned a code rule which can be evaluated according to selected design options to identify the appropriate variant for each position and thereby the part which should be used at the associated part location in a specified design variation. Connections between parts can be similarly represented and identified. Code rules are defined and evaluated to ensure that at most one variant is selected for each position because no matter how many design variations there are for a given article, in any particular article, only one part can actually be used in each location. In other words, the variants associated with any given position are in an exclusive—or relationship to each other.

In addition, every part in a given article is connected to at least one other part in some manner. In a further embodiment of the invention, these connections can be represented in the net as links between positions, or alternatively, as connection positions. Process information describing the type or method of connection between two parts, such as a weld or friction fit, can be associated with the corresponding position links or connection positions. If different kinds of connections between parts are possible, such as may result when different part variants are available, appropriate process variants can be associated with a link and assigned corresponding code rules in a manner similar to variants associated with a given position. In addition, if a particular part must be processed in some manner before installation, for example, by applying oil or grease, such process information can be associated with the variant identifying the part. Additional data which can be associated with a connection variant include data which is used to group various positions into subassemblies, to associate part groups with particular suppliers, etc. Further data related to production, process, and fabrication of the article may also be added to the position variants and/or links to fully document all aspects of the design across the entire life cycle of the various parts and assemblies used.

According to a further aspect of the invention, the net representation can be translated into a BOM suitable for use in an MRP process. In addition to listing each part variant and its associated code rules, as is done in conventional systems, the BOM also associates each variant with a specific position corresponding to, e.g., a physical location in the article. This additional information permits all variants of a given position to be quickly determined. Advantageously, long code rules for each variant need not be used, but instead shorter, easier to understand rules may be used, even if those rules are not logically complete and overlap to some extent. At predetermined times, such as after a new variant is defined, all rules from variants associated with the affected position can be automatically identified, analyzed, and updated as needed to be logically consistent, minimize overlap, and to properly take into account the effect of other variants.

According to a further aspect of the invention, an improved method and system for calculating manufacturing parts requirements on the basis of customer orders is presented. Prior to evaluating the code rules in a BOM, each unique code rule is extracted from the BOM, assigned a unique rule ID, and placed in a code rule matrix. Each code rule in the code rule matrix is then evaluated only once, and in parallel, for all customer orders to be analyzed and the results stored in an evaluated code rule data matrix. The evaluated code rule data is then mapped back to each code rule entry in the BOM.

Because only one bit per unique rule per order is needed to store the results of the unique code rule evaluations, the resulting data matrix is very small when compared to the output file of a conventional MRP system and can be stored entirely in RAM (random access memory). Advantageously, because each unique code rule is only evaluated once, regardless of the number of times it appears in the BOM, and because the number of unique code rules is generally substantially less than the total number of entries in the BOM, a significant decrease in processing time is achieved. Processing can be further optimized by simplifying and factoring the code rules prior to evaluation. (random access memory). Advantageously, because each unique code rule is only evaluated once, regardless of the number of times it appears in the BOM, and because the number of unique code rules is generally substantially less than the total number of entries in the BOM, a significant decrease in processing time is achieved. Processing can be further optimized by simplifying and factoring the code rules prior to evaluation.

Using a system which includes various features of the invention, an article of manufacture can be manufactured by initially defining a plurality of positions corresponding to different, predefined physical locations in the article. One or more variants are assigned to each position, where each variant corresponds to a particular part or assembly which can be placed in the location associated with the position. For any given manufactured unit, only one part can be placed in a given physical location and so only one variant can be selected for each position. Each variant therefore has an associated manufacturing code rule which indicates when the particular variant should be used in accordance with specified design options.

When a particular ordered product is to be manufactured, the code rules are evaluated to identify the proper variant to select for each position and thus the specific parts needed to build the ordered product. This information is then used to ensure that the necessary parts are available and are delivered to the correct assembly line stations. The ordered product is then manufactured using the identified parts.

Advantageously the system and method of the invention permit savings in a variety of costs, including costs related to materials, diagnostics, delivery, production planning and recalculation, product re-engineering, personnel, and recycling.

BRIEF DESCRIPTION OF THE DRAWINGS

The foregoing and other aspects and advantages of the invention will be better understood from the following detailed description of preferred embodiments of various aspects of the invention with reference to the drawings in which:

FIGS. 1–5 are graphical representations of a position/variant data net for representing an article of manufacture and design variants;

FIG. 8*a* illustrates a net containing group definition data for the groupings of FIG. 6;

FIG. 11 illustrates a linking between a position in a net and a part description in a CAD system;

FIG. 12 is a table illustrating a portion of a bill of materials (BOM) for a given car design;

FIG. 13 is a sample customer order matrix;

FIG. 17 shows a sample evaluated rule matrix;

FIG. 18 is an illustration of a manufacturing resource planning (MRP) matrix for the BOM of FIG. 16 and the evaluated rule matrix of FIG. 17;

FIG. 19 shows a sample material resource planning matrix;

FIGS. 21 and 22 are flow diagrams of a particular method of evaluating the code rules in the code rule matrix;

FIG. 23 is a sample code rule matrix;

FIGS. 24–25 are intermediate code rule evaluation matrixes;

FIG. 27 is an illustration of an evaluated rule matrix in accordance with the intermediate matrix shown in FIG. 26.

DETAILED DESCRIPTION OF THE PREFERRED EMBODIMENTS

Figure 4:
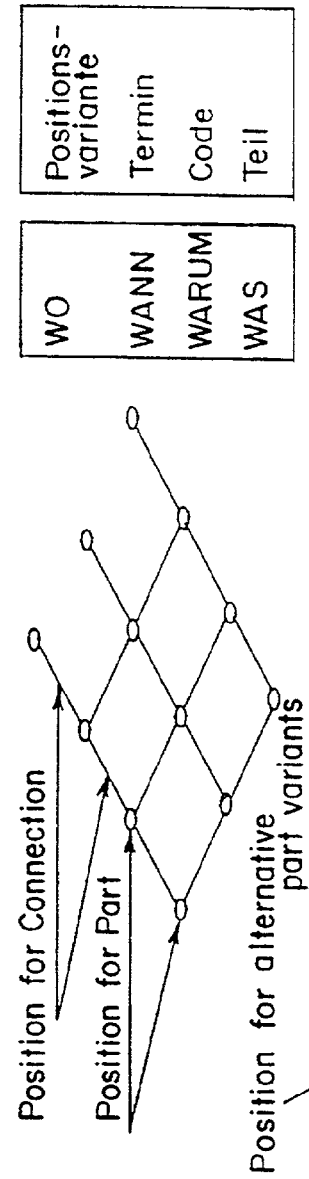

FIGS. 1–5 are graphical representations of a uniform product model or net 10 which represents an article of manufacture having a number of design variants and which can be used to analyze the article for the purposes of determining parts requirements manufacturing data, etc. For simplicity in the following discussion, the article of manufacture will be considered to be a car. However, this is not intended to be limiting and the invention can be applied to other articles of manufacture. In addition, the invention will be discussed primarily with regard to variations in the parts used to manufacture a given article. However, as detailed further below, variations in connections between parts can be treated in a similar manner. Accordingly, while the term "part" is used throughout, one of skill in the art will appreciate that various features of the invention can also be adapted to represent and process connection requirements.

Net 10 has a plurality of positions 12 connected by links 14. Each position has a unique position ID that can be mapped to an actual physical location in a manufactured product. At each position 12, one or more position variants 16 are defined. (FIG. 2) Each variant 16 identifies a specific part which can be placed in the article at the location corresponding to the position associated with the position variant. The actual part used is dependent on the specific design variation to be built. Thus, the position variants for a given position represent all the possible parts which can be placed in a given physical location in a manufactured article.

The collection of variants for all positions collectively describe every potential design variation of the article.

In the net 10 shown in FIG. 2, position 12 includes three position variants 16a, 16b, and 16c. The specific position variant which should be selected for a given manufacturing order is dependent on the design options selected by, e.g., the customer. For example, position variants 16a–16c may indicate that the specified position, and ultimately, the associated location in the article, can contain either a 4-, 6-, or 8-cylinder engine, respectively. FIG. 3 is an illustration of three nets 10a, 10b, and 10c, which correspond to the three product variants that are defined by the net 10 of FIG. 2. FIG. 4 illustrates various nets with position variants and connecting links of various complexities.

To reflect the fact that at most one position variant 16 can be selected for a given position 12, each position variant has an associated code rule that indicates when the specific position variant should be selected. Code rules can be assigned as position variants are placed in the net and will be described in more detail below. In addition to identifying a specified part (i.e., by referencing a part number in a master part database) and having an associated code rule which indicates when the part should be used, position variants can also have additional associated data which indicates, for example, a time period during which the particular position variant (and associated code rule) is valid, the assembly line station where the part must be present during product manufacturing, the estimated duration of time needed to install the part, preprocessing (e.g., oiling or greasing) which must be done to the part prior to installation, etc.

Advantageously, the position and position variant representation of the product design illustrated in net 10 can be mapped directly to a bill of materials ("BOM") for use in an automotive manufacturing resource planning ("MRP") system. In addition, the position can be used as a reference to link the BOM (or net) representation to other design representations, such as parts or connections defined in a CAD system. These aspects of the invention are discussed in more detail below.

Figure 5:
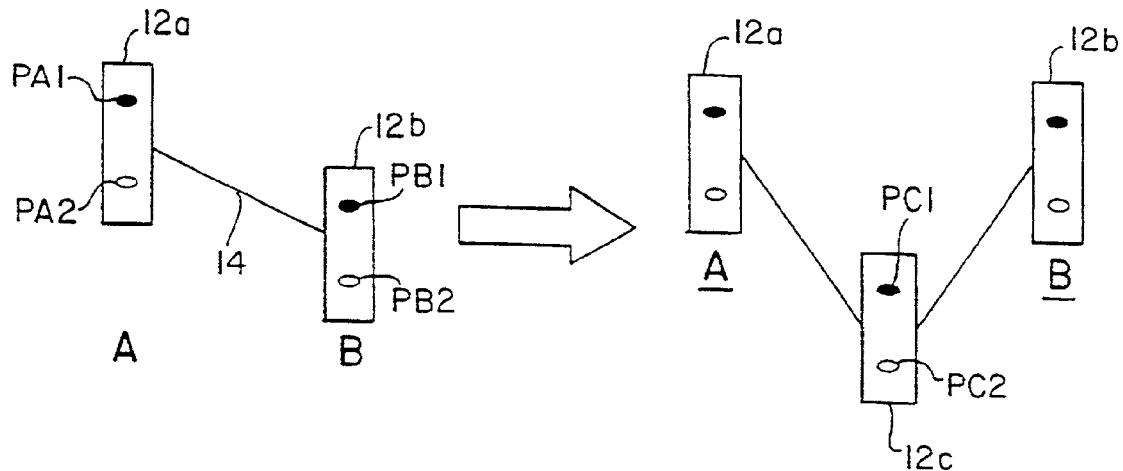

Links 14 between the positions 12 indicate connections between parts. In some instances, particularly when two connected positions each have associated variants, the type of connection between parts may vary. With reference to FIG. 5, position 12a, with position variants PA1, PA2, is connected to position 12b, with position variants PB1, PB2. Depending on the position variant selected, the type of physical connection between the parts installed at the locations corresponding to positions 12a and 12b can differ. For example, parts PA1 and PB1 must be joined with bolts while parts PA2 and PB2 must be joined to each other by clips.

This difference in connection type can be represented by defining a new unique connection position 12c between position 12a and 12b and having variants which indicate the type of physical connection required. The code rules associated with each of the variants at positions 12a, 12b, and connection position 12c are defined such that the proper connection variants are selected. In the example of FIG. 5, one code rule can be assigned to the first variant in each position 12a, 12b, and 12c and a second code rule assigned to the second variant of these positions. When the first code rule is true (and the second false), the net indicates that parts PA1 and PB1 are connected by PC1. When the second code rule is true and the first false, the net indicates that parts PA2 and PB2 are connected by PC2. Of course, the code rules for the connection position 12c need not be the same as that of the connected positions 12a, 12b. For example, if parts PA1 and PB1 can be joined to each other either by welding or by clips, the code rules for the variants at position 12c can be defined to allow either of these design variations to be selected in accordance with a particular product order.

Other types of information may also be assigned to the links and possibly the position variants. Such information includes data related to product assembly and production planning, types of assembly equipment required, part availability dates, product documentation, part and connection failure data, etc. While similar types of information have been generated for use in and by conventional manufacturing and assembly plants, such information has previously been separately maintained. Advantageously, by use of the present invention, all such information can be integrated into a single production data model.

It can be appreciated that a position can be defined for every connector which is used to join two or more parts to each other. However, a connection often is made with multiple duplicate parts. i.e. two parts may be fastened to each other with eight bolts. To simplify the representation of multiple identical parts which are essentially used at the same location in an article, a part multiplier indicating how many of a given part (or connection) are used can be associated with the position variant and referenced when calculating parts requirements.

Figure 6:
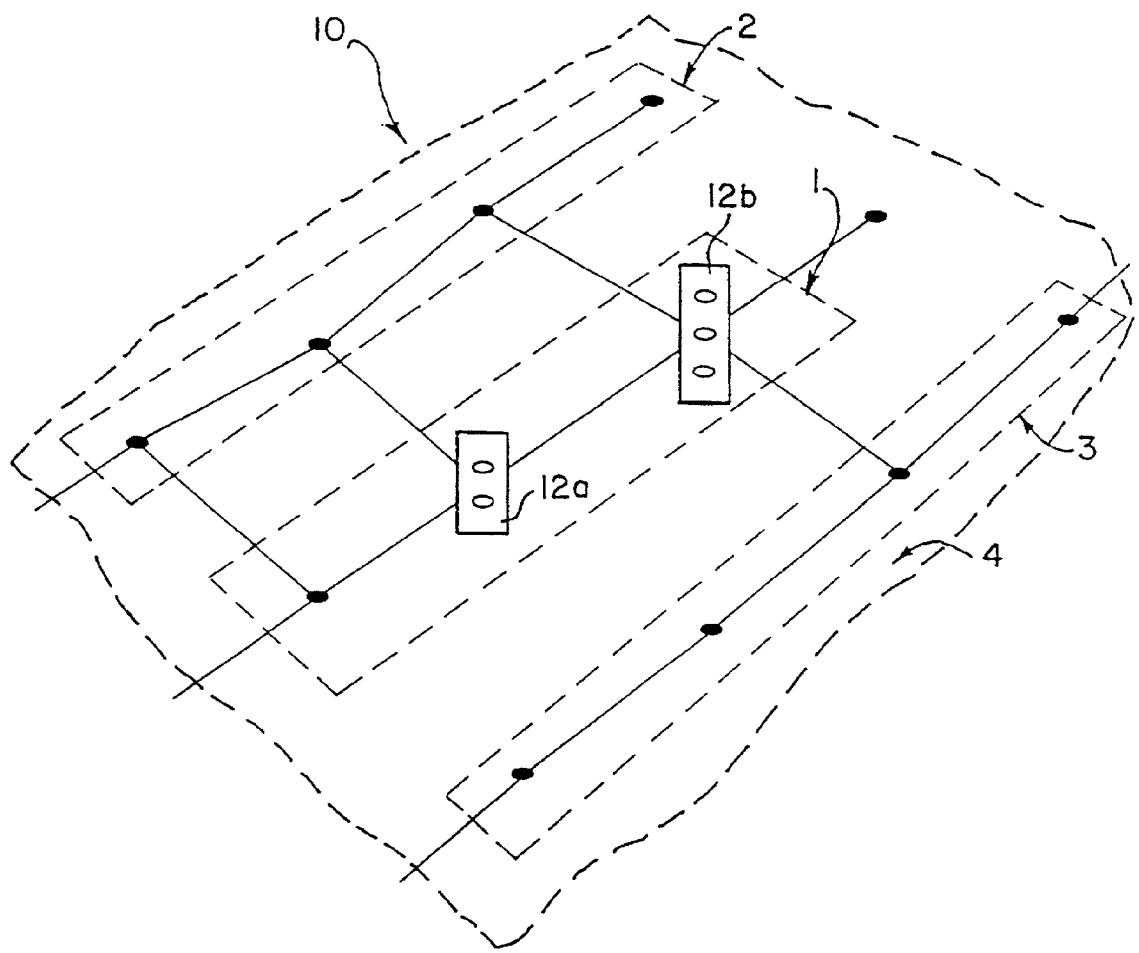
FIG. 6 illustrates various sub-assemblies and assembly groupings in a position/variant net.

It is possible, if desired, to group positions into sub-assemblies and sub-assemblies into assemblies in order to visualize how the various parts in a design fit together and to create assembly hierarchies. In addition, components are often combined into separate assemblies which are connected together at a later time. FIG. 6 is an illustration of a net 10 in which positions 12 have been grouped into sub-assemblies 1, 2, and 3, and these sub-assemblies have been further combined into assembly 4, as indicated by the broken-lines.

Figure 7:
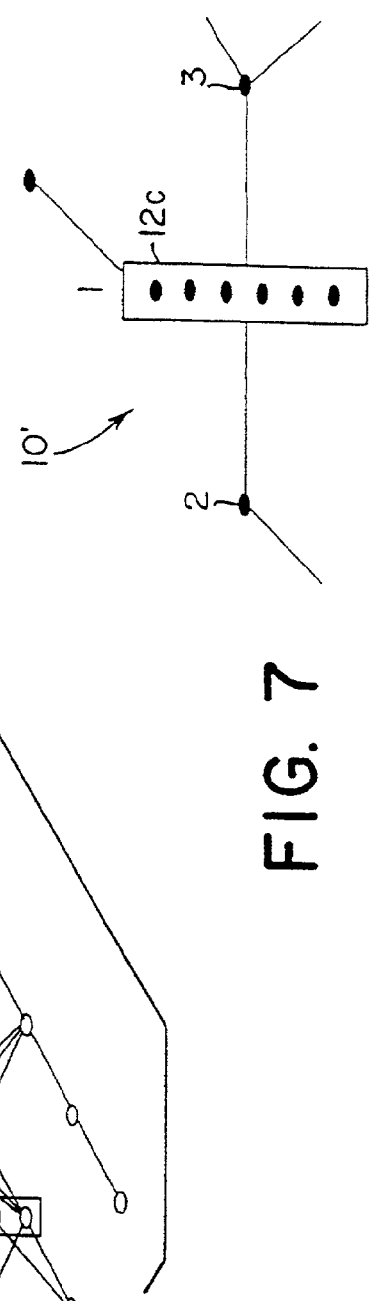
FIG. 7 illustrates a hierarchical net related to the net of FIG. 6.

Groupings can be used to define production nets at different levels of assembly hierarchy. FIG. 7 is an illustration of a net 10' showing the relationship between sub-assemblies 1, 2, and 3 at a hierarchical level above the base net 10 of FIG. 6. As shown in FIG. 6, sub-assembly 1 includes position 12a with two defined position variants and position 12b with three defined position variants. Thus, there are a total of 2*3=6 design variations of sub-assembly 1 in FIG. 7, which variations encompass the variants of the individual positions within the sub-assembly. These are shown as position 12c. It can be appreciated that as the hierarchical level of the net increases, the number of potential variants for each position also increases dramatically.

Figure 8B:
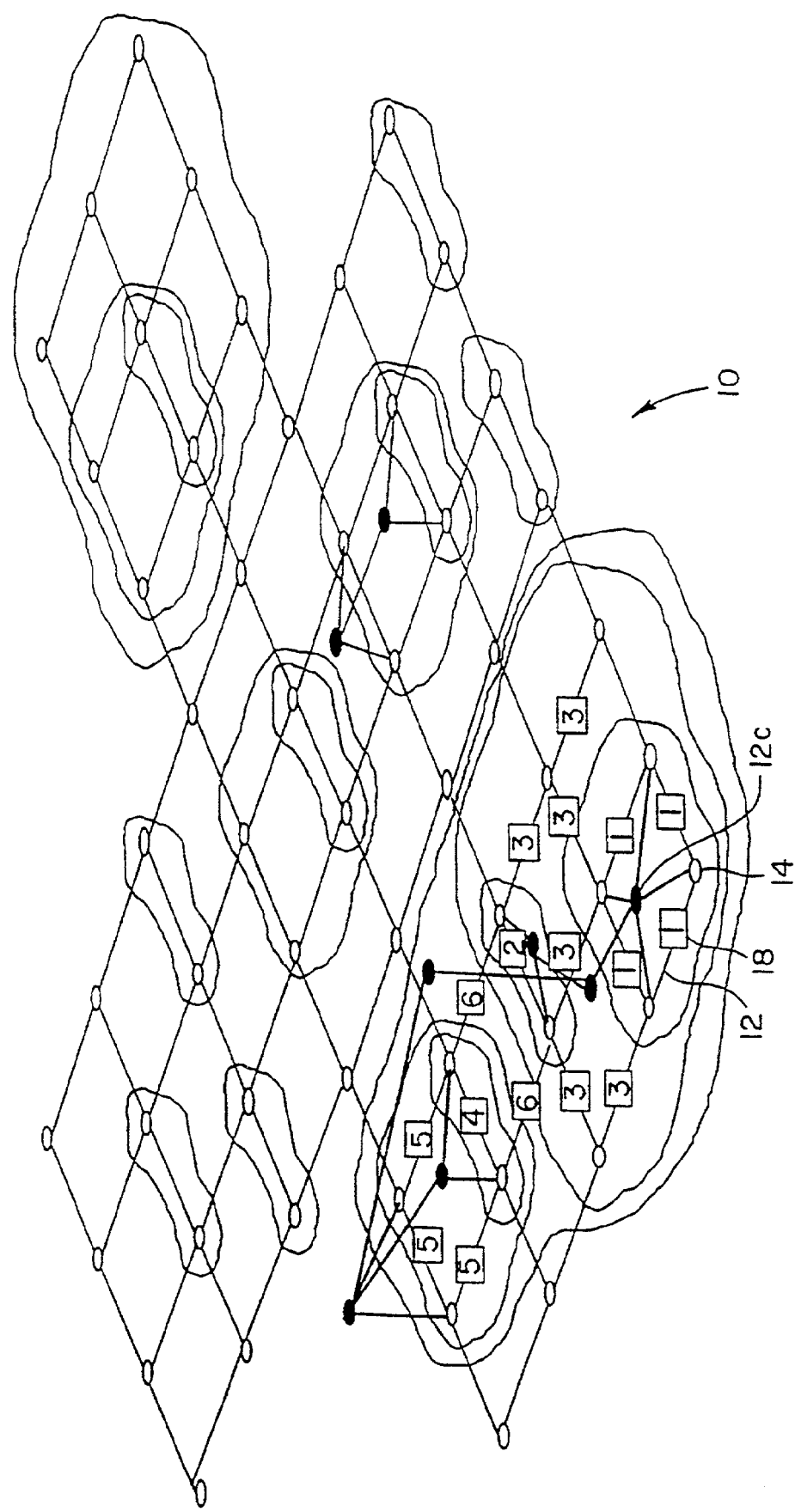
FIG. 8*b* is an illustration of a net containing group definitions as in FIGS. 6 and 8*a* and a hierarchical structure as in FIG. 7.

One method of representing part groupings is by assigning a particular group number to each link 14 between the positions 12 in the group. FIG. 8a is an illustration of such a group definition that corresponds to the graphical grouping shown in FIG. 6. As shown in FIG. 8a, a group number 18 (e.g. "2") is assigned to each link 14 connecting the positions 12 in the group. Groupings, such as illustrated in FIGS. 6–8, can represent physical groupings for produced sub-assemblies and can be used to define nets 10 at different hierarchical levels of representation, such as net 10' shown in FIG. 7. FIG. 8b is a more complete illustration of a net 10 which illustrates the grouping concepts shown in FIGS. 6 and 8a and the hierarchical structure of FIG. 7.

In addition, other, perhaps overlapping, groupings can be defined to represent functional groups (e.g., all positions in the electrical system), or other useful sets of information, such as parts which must be painted. These groupings define hierarchical "view points" from which aggregate information about the included parts can be generated. A viewpoint is distinct from a position in that a position can be mapped to a physical location in the product which contains at most one part (or sub-assembly) while a viewpoint can have attributes which represent various aggregations of information related to grouped positions and position variants.

Figure 9:
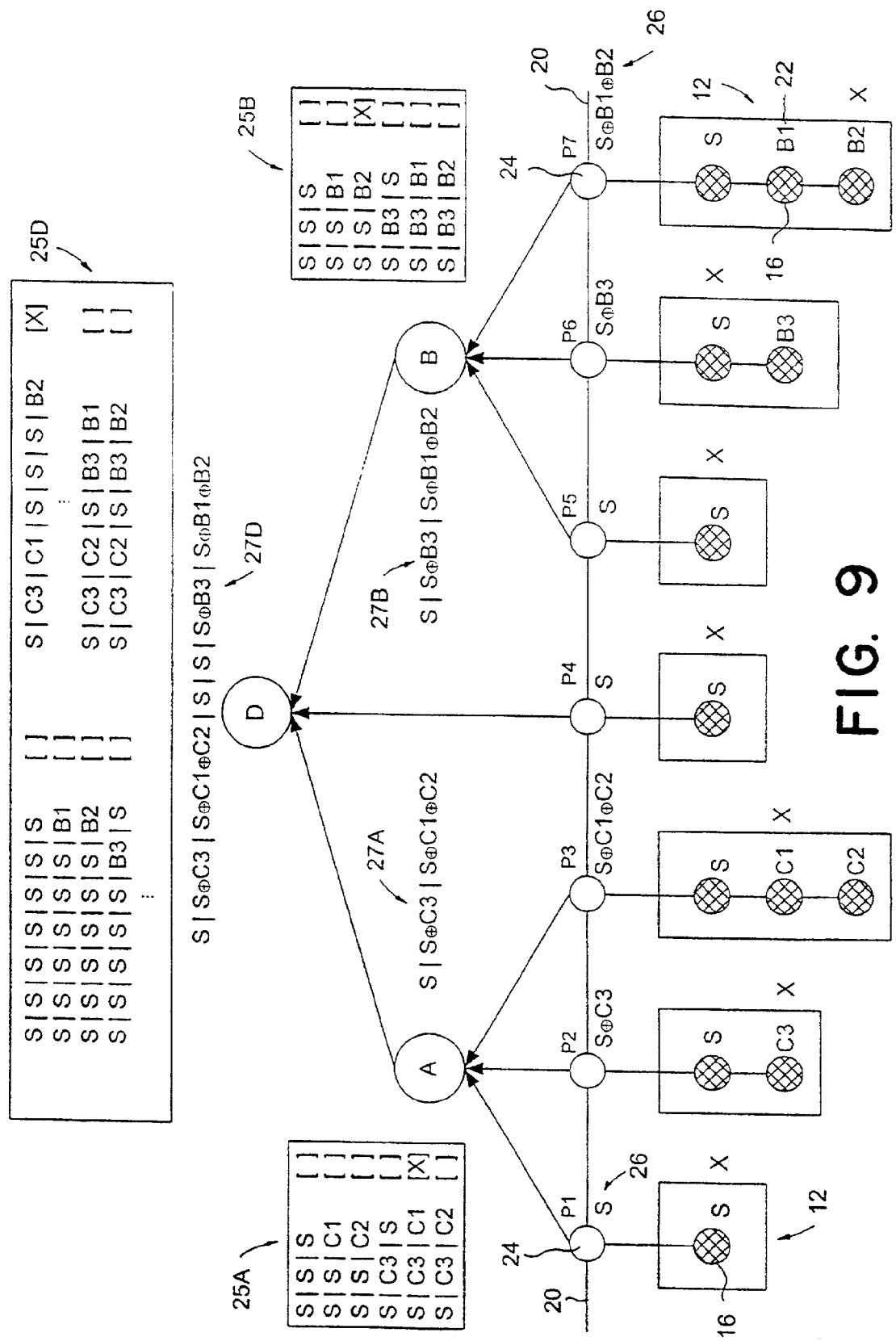
FIG. 9 is a representation of a number of positions and variants relative to an assembly line.

FIG. 9 is a representation of a number of positions 12, each with one or more position variants 16, presented as the various parts may be placed along an assembly line 20 having assembly stations 24 which assemble parts P1–P7. Each position variant 16 is illustrated with an associated representative code rule 22. The actual parts which are used during assembly are selected according to which one of the possible position variants is appropriate for a given order. The possible position variants for each particular position can be summarized as a combination 26 of the position variant code rules 22.

For example, at line position P3, one of three position variants can be selected according to the evaluation of code rules S, C1, and C2. In a combination of the three variants only one position variant 16 may be properly selected for the position 12, and thus only one of the three code rules 22 is properly true for a given order.

The parts P1, P2, and P3 can be grouped into a subassembly A which has 6 variants, of which only one can be selected. Box 25A details the 6 possible variants of subassembly A, where "|" indicates the combining of parts (as represented here by the code rule assigned to the position variant defining the part). The six possible subassembly variants can be written in shorthand as a combination of the summarized code rules. Thus, the set of possible subassemblies A can be designated as "S|S⊕C3|S⊕C1⊕C2" (Ref. 27A). Similarly parts P5, P6, and P7 can be grouped into a sub-assembly B which also has 6 variants, detailed in box 25B and summarized as "S|S⊕B3|S⊕B1⊕B2" (Ref. 27B). Sub-assemblies A and B and part P4 can be further grouped into an assembly D, which has 36 variants, summarized as "S|S⊕C3|S⊕C1⊕C2|S|S|S⊕B3|S⊕B1⊕B2" (Ref. 27D). A portion of the 36 design variations for assembly D are detailed in Box 25D.

The subassembly and assemblies A, B, D, can be mapped directly to a net 10, such as previously illustrated. In addition, the positions which make up sub-assemblies A, B, and D can be grouped together to define viewpoints with various functions assigned to them which are evaluated once the specific design variants have been chosen. For example, a viewpoint A' (not shown) can be defined to be the weight of the selected position variants making up sub-assembly A, the aggregate cost of the sub-assembly, the time to assemble, the position on the assembly line where the sub-assembly is completed, etc.

In addition to detailing design variations, e.g., via net 10, it is also necessary to provide separate documentation for assembly and sub-assembly variants which are manufactured. Such documentation is used in making marketing decisions about various options and also to ensure that information about all the parts used in each product produced is available for historical analysis associated with actions such as product recalls.

In a conventional system, documentation is generated using a "top-down" approach, starting from the assemblies at the "top" of the hierarchy (e.g., assembly D of FIG. 9) and then moving to smaller sub-assemblies. However, as illustrated, the total number of design variations increases dramatically as more positions and position variants are included in the assembly definition. In a conventional approach, all thirty-six variants of assembly D in FIG. 9 would be separately documented or, alternatively, the number of permissible variants would be limited.

In contrast, and according to an aspect of the invention, documentation for assemblies, etc., is generated from the bottom up. In this way, documentation is created for the actual assemblies made, instead of creating documentation for all possible assemblies, regardless of whether they are in fact made or not. In particular, the information necessary to prepare the documentation for a given assembly is distributed among all of the included variants for each position as the variants are defined. Each specific variant has associated data which represents the information to include in an assembly documentation for assemblies that include the variant. When a particular order is filled, the specific variation of the assembly to be produced will be known since a position variant will have been selected for each position. Once the individual variants are known, a check is performed to determine whether the resulting assembly has been previously documented. e.g., as may occur if a prior order resulted in manufacture of the same assembly variation. If the assembly has not been documented, the documentation information associated with each selected position variant is combined to create the historical documentation needed for the assembly. Thus, assembly documentation is created as needed, using a bottom-up approach, in a manner which permits a large number of possible assembly variants to be available for manufacture while also ensuring that each manufactured assembly variation is properly documented.

For example, In FIG. 9, the specific position variant selected for each position 12 is indicated by an "x". These selections indicate that the fifth variation of sub-assembly A, "S|C3|C1", has been selected and the third variation of subassembly B. "S|S|B2" has been selected. The combination identifies the specific one of the 36 possible variations of assembly D which will be built (e.g., "S|C3|C1|S|S|S|B2"). The documentation associated with each position variant can be combined to produce documentation for the specific variant selected.

Figure 10:
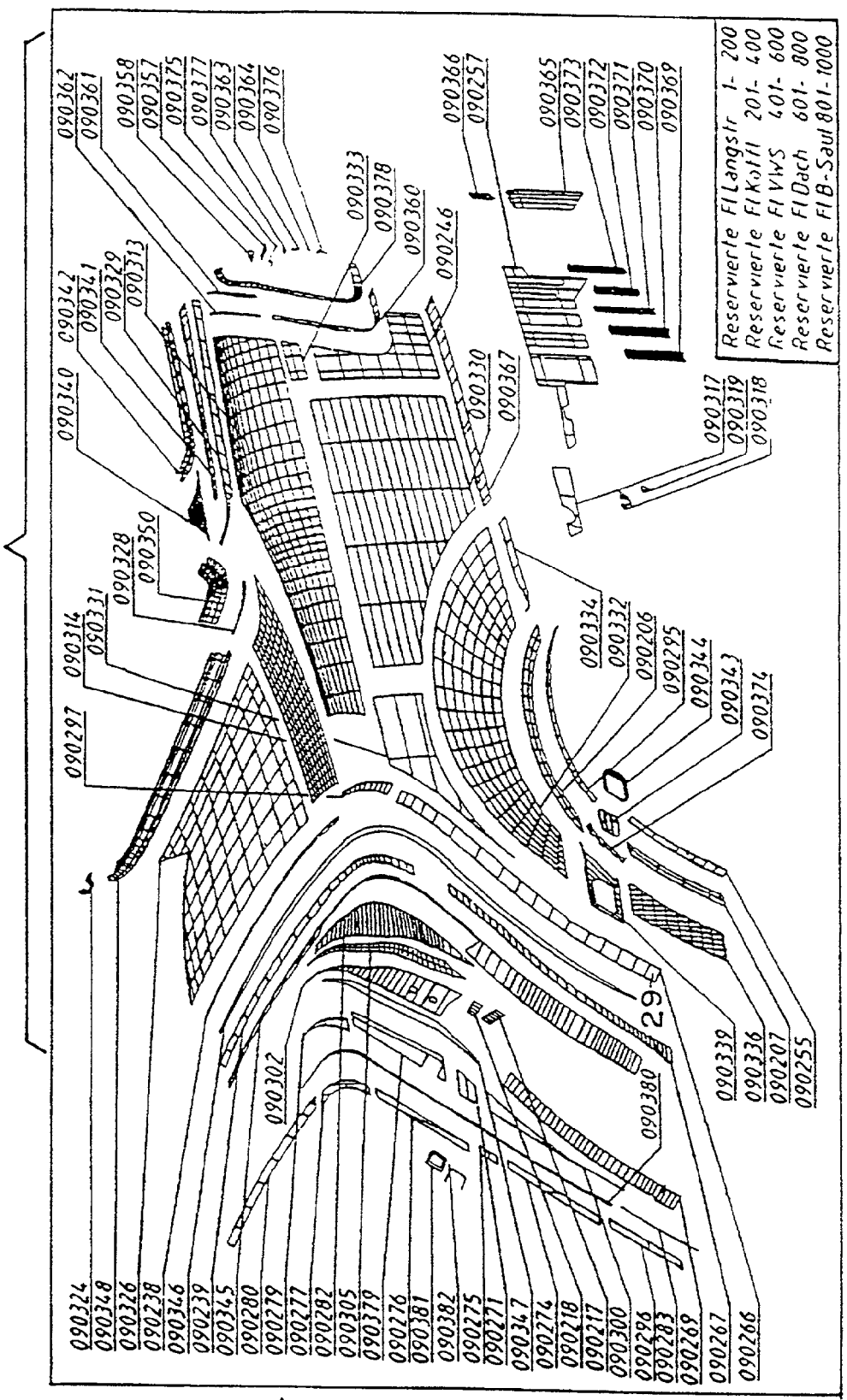
FIG. 10 is an example of a CAD representation of one variant of a side panel for a car.

As previously noted, positions 12 in net 10 can be used as a key to link the net representation of a product with a representation in a computer aided design ("CAD") system. In a CAD system, parts are generally represented as a collection of various part attributes, such as surface contours, bends, projections, etc. FIG. 10 is an example of a CAD representation of one variant of a side panel for a car. As shown, a single component 28 may have a very large number of CAD design elements 29. These elements 29 can be combined into a single element 30 in the CAD system which represents one part or connection between parts that is used during car assembly. The CAD part number or connection number can then be tied to the net representation 10, e.g., by including the CAD part number as an attribute of a variant defined for that position. This linking is graphically illustrated in FIG. 11 where the collection of CAD elements 29 defining CAD component 28 are all assigned to a reference label 30 which is then associated with a particular position variant 14 of a position 12 of net 10.

Various methods of storing the information represented by net 10 in a computer system can be used, as will be apparent to one of skill in the art. For example, the various positions 12 can be represented using a complex or object-oriented data structure which contains each element definition. Alternatively, the position and position variants can be directly implemented as a net of linked data nodes, each having associated data values. Other data structure arrangements known to those of skill in the art can be used as well.

In a preferred embodiment, the information is stored in a database as a data matrix which can be used as a production BOM and, when combined with a set of customer orders, used to determine what parts are needed to produce the orders, when they are needed, and where on the assembly line the parts need to be delivered. This particular implementation of the invention will now be discussed.

FIGS. 12a–12b shows a table illustrating a portion of a bill of materials (BOM) 100 for a given car design. The BOM 100 contains a large number of records (rows) 101, each of which identifies a specific position 12 and position variant 16 which corresponds to the position and position variant information described generally above with respect to net 10. Each BOM record 101 also specifies a part ID 102 and a code rule 104 (corresponding to code rule 22 in net 10). In the sample table of FIGS. 12a–12b, the first six records all have the same position "10 16 04 0100" (reference No. 108) and different variant identifications (reference No. 110). As can be seen, each position variant in position "10 16 04 0100" has a different part ID number and code rule.

Although detailed part information can be included in each record 101, the part ID 102 is preferably used to reference a master parts list (not shown) which contains detailed information about the part, such as the manufacturer of the part, its weight, cost, delivery time, etc. BOM records 101 can also contain a textual part name 106, a model number or type 105, as well as additional information including a time period within which the variant (and code rule) is valid, an assembly line position to which the part should be delivered if needed, the estimated time installing the part will take, etc. (all not shown).

As discussed above, code rules are used to determine when a given position variant should be included in a particular product order. Each code rule is a logical statement including one or more code rule elements, where each code rule element corresponds to an option which can be selected in a product order to be manufactured. In addition, a code rule can indicate whether the position variant is "standard" or default, and therefore whether it should be used if no other relevant options have been selected.

FIG. 13 is a sample customer order matrix 120 which contains a plurality of build options 122 and associated code rule elements 124 for multiple orders of a specific car model. For example, code rule elements "M113", "M136", "M154" and "M172" represent the type of engine while code rule elements "494", "498", and "625" indicate the country in which the ordered car is to be sold. Customer order matrix 120 further contains selected option information for a plurality of customer orders 126, each order corresponding to a column indicating which build options are included in the order, and therefore also indicating whether each particular code rule element is true or false for the order. A "1" in a particular row of an order column indicates that the corresponding option has been selected for that order and that the associated code rule element is true.

By evaluating the code rules in the BOM 100 using the data in the order matrix 120, a determination can be made about the specific parts required to manufacture the given product order. Preferably, the sequence of orders 126 in the order matrix 120 indicates the sequence in which the cars will be manufactured. The time when each car will reach various manufacturing points can be determined based on information including the speed of the assembly line and possibly other factors related to the specifics of the particular order, such as the time required to install particular parts. (By including the time duration required to install particular parts within the position and position variant information in the BOM, an estimate of the manpower or other resources required to assemble the order can also be determined.) By using knowledge about what parts are required and when they are required for a given order, as well as the position the part corresponds to, the necessary parts can be routed to the correct assembly line stations as they are needed, allowing the number of parts stored at each station to be minimized.

As mentioned above, each position variant entry in the BOM contains a code rule which indicates when the designated part should be used when a given customer order is built. As can be appreciated, certain parts used in the car, such as an element in the exhaust system, may be dependent on more than one option. For example, the part selected may depend on both the engine type selected and the particular country in which the car is to be sold (e.g., as a result of various legal requirements). Such position variants can be represented in a BOM using shorthand or "short" code rules as follows:

| POS | POSV | PART NO. | SHORT CODE RULE |
|---|---|---|---|
| 1000 | 001 | P1 | M113; (SR1) |
| 1000 | 002 | P2 | M113 · 494; (SR2) |
| 1000 | 003 | P3 | M113 · (496 + 625); (SR3) | where "·" indicates a logical AND and "+" indicates a logical OR. In position 1000, part P1 is used when the Turbo Diesel engine (M113) is selected, part P2 is used for a Turbo Diesel engine in a car produced for sale in the US (494), and part P3 is used for a Turbo Diesel engine car produced for sale in Japan (496) or Australia (625). Because all three parts P1, P2, and P3 are associated with the same position (which corresponds to a physical location in the car), the parts are mutually exclusive options and only one can be selected for use in a given product order. While an individual viewing the short code rules may understand this distinction, the short code rules are inadequate for logical analysis purposes, such as calculating manufacturing part requirements, because code rule SR1 will be true whenever code rule element M113 is true, even if code rules SR2 or SR3 are also true.

To eliminate this ambiguity, the separate short code rules can be combined such that each code rule contains elements which guarantee that the rule is not true when another variant should be used. For example, short code rules SR1, SR2, and SR3 can be combined to generate long code rules LR1, LR2, and LR3, where, for example, LR1 is true when SR1 is true and both SR2 and SR3 are false. For the above example, the resulting long code rules may be expressed as follows:

| POS | POSV | PART NO. | LONG CODE RULE |
|---|---|---|---|
| 1000 | 001 | P1 | M113 · –(494 + 496 + 625); (LR1) |
| 1000 | 002 | P2 | M113 · 494 · –(496 + 625); (LR2) |
| 1000 | 003 | P3 | M113 · –494 · (496 + 625); (LR3) | where the "–" operator indicates a logical NOT. Although the resulting equations can be reduced to some extent, they are relatively long and cumbersome to work with. However, because of their accuracy, conventional MRP systems require that long code rules be used for each position variant which is defined. As a result, definition and entry of code rules for use in a conventional MRP system is a tedious and potentially error prone process.

One of skill in the art will appreciate that long code rules are often more complex than necessary, especially when they apply to required and/or mutually exclusive options. However, they are often used in conventional systems so that errors in customer order selection will not produce drastically corrupted parts data. In a preferred implementation of the invention, customer orders are preprocessed to detect situations in which mutually exclusive options are selected or a required option selection has not been made in order to prevent those orders from being used to evaluate BOM code rules. For example, an order must have only one engine type selected. An order with no engine type selected or two engine type selections is in error and may result in erroneous data when the code rules are evaluated. By filtering out problem orders during preprocessing, the code rules which are implemented in the BOM 100 do not need to be as robust as the long code rules described above, and therefore, can be simplified.

For the short code rules SR1, SR2, and SR3, above, for example, if orders are preprocessed to ensure that two country selections have not been made, short code rules SR2 and SR3 will never be true at the same time. Thus, it is not necessary to expressly guard against this occurrence with the more complex long code rules LR2, LR3. Instead, the only code rules which need to be expanded to eliminate overlap with other rules are those code rules which describe "supersets" of other variations (e.g., the set of orders with engine type M113 is a superset of the set of orders with engine type M113 to be sold in the United States). The remaining rules can be left in the simplified short code rule form, thus reducing the overall complexity of the defied code rules and decreasing the time required to evaluate them. A set of such "complete" rules for the above example is shown below.

| POS | POSV | PART NO. | COMPLETE CODE RULE |
|---|---|---|---|
| 1000 | 001 | P1 | M113 · −(494 + 496 + 625); |
| 1000 | 002 | P2 | M113 · 494; |
| 1000 | 003 | P3 | M113 · (496 + 625); |

It is apparent that in both the long code rule and the complete code rule representation, at least one of the code rules depends on the code rules which have been defined for other variants. A significant problem with conventional MRP systems is that the BOM which lists position variants and associated code rules does not associate each defined position variant with a particular position corresponding to a physical location in the product. Because of this deficiency, it is difficult to identify all code rules which may be affected by the new variant. Thus, the long code rules for all variants are typically generated manually at the same time. In addition, as variants are defined at later points in time, e.g., a new type of steering wheel option is made available, several code rules may need to be updated. However, because the BOM in a conventional MRP system does not include the information needed to identify the potentially affected rules, the necessary manual revisions of code rules can be a cumbersome and error-prone process.

According to a further aspect of the invention, the inclusion of position and position variant information within the BOM simplifies code rule definition by permitting position variants to be initially defined using short code rules. Corresponding long or complete rules are automatically generated as needed. In a preferred embodiment, at predefined times, such as when a new position variant for a given position is added, the BOM 100 is automatically examined and all position variants for that position are extracted. The existing code rules are then analyzed and the new code rule and the previously defined code rules are revised as needed to account for overlaps between the code rules.

For example, a series of short code rules can be combined to generate corresponding long code rules or, if orders are preprocessed to ensure validity, generate a corresponding set of complete code rules. Various methods for determining the overlap in scope between the identified code rules and adjusting the identified code rules to remove at least some of the determined overlap. e.g. by applying set theory, will be apparent to one of skill in the art. If an ambiguity is detected and cannot be automatically resolved, it may be necessary to manually resolve the ambiguity or correct the new code rule as needed. The adjusted code rules that are generated, which may be quite complex, are then automatically included in the BOM 100. The short rules can also be retained in the BOM for future reference.

A method for determining manufacturing resource data for use in various functions, such as invoicing, inventory control, and parts routing, will now be discussed with reference to the flow diagrams in FIGS. 14a, 14b, 15a, and 15b.

Figure 14A:
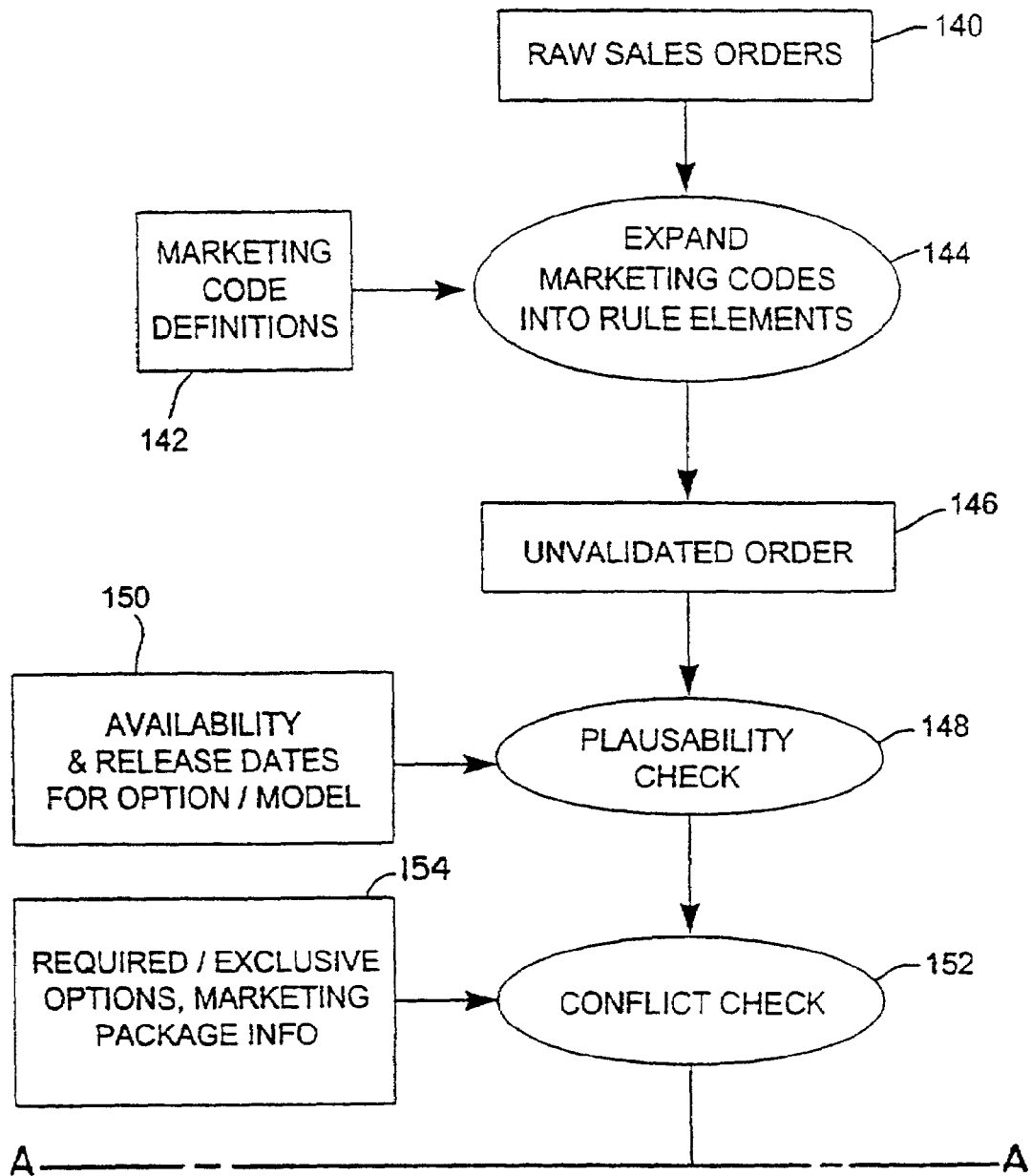
FIG. 14 is a flow diagram of a method for generating an order matrix.
Figure 14B:
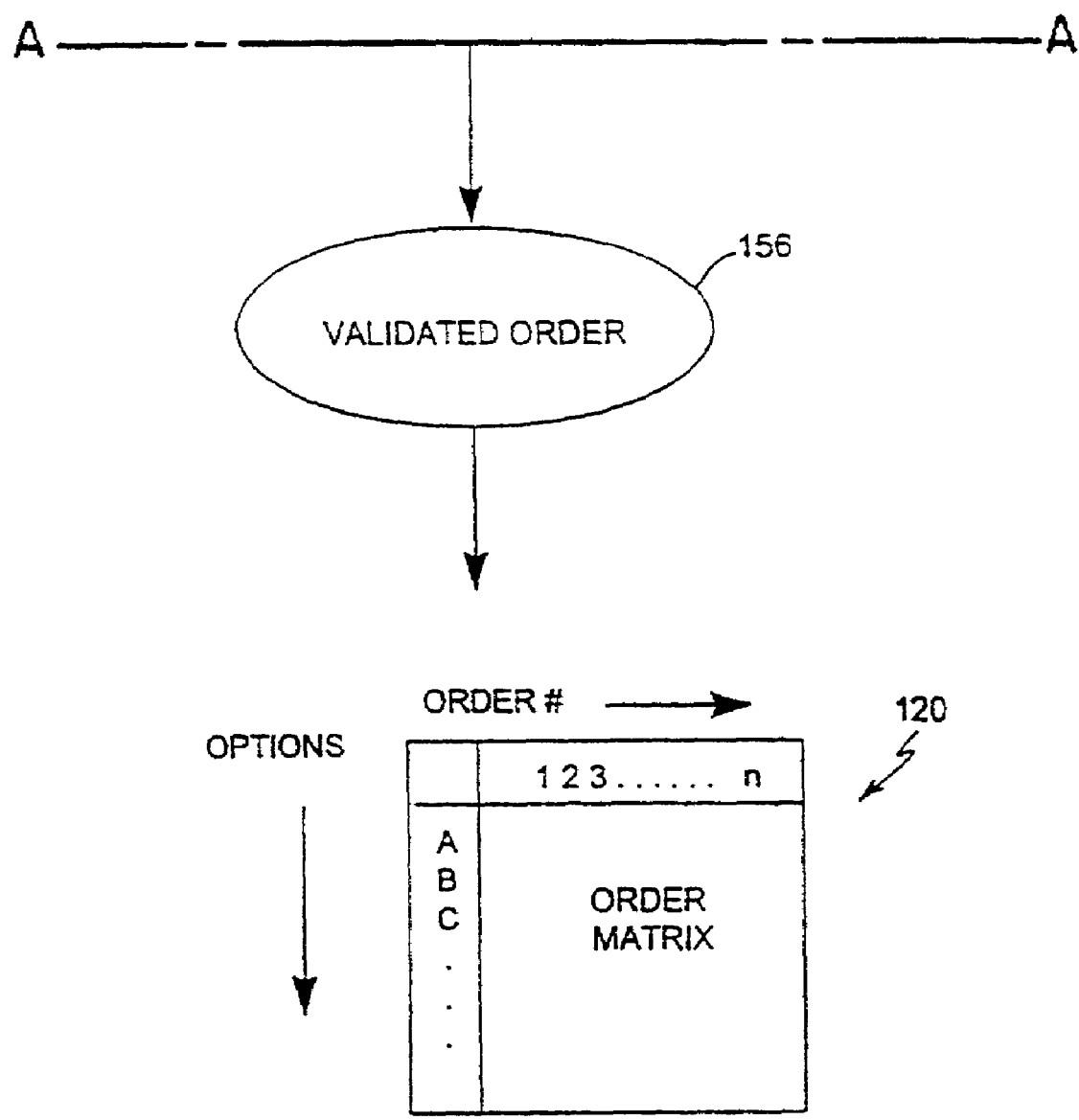
Figure 15A:
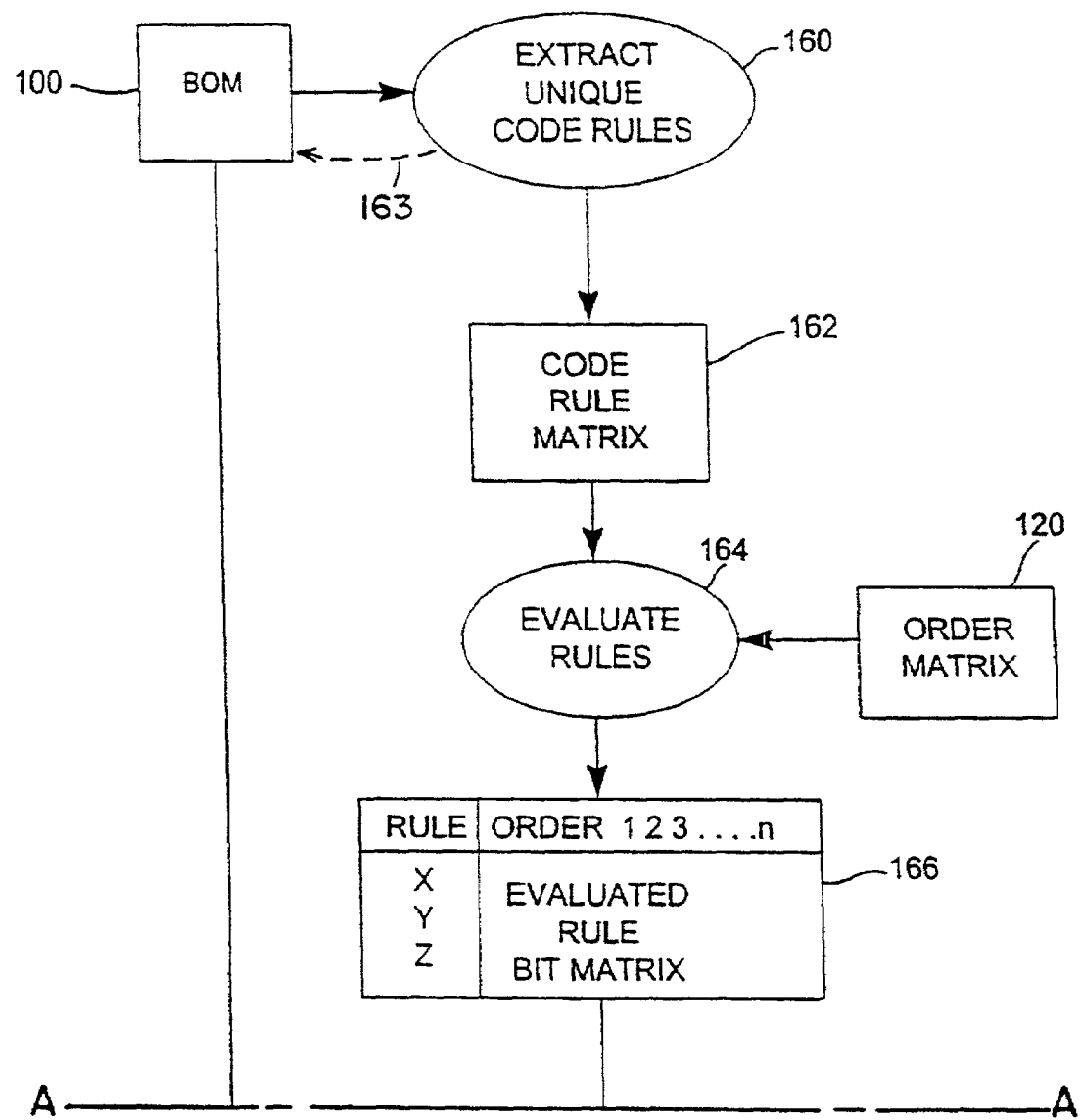
FIG. 15 is a flow diagram of a method for evaluating the code rules in a BOM.
Figure 15B:
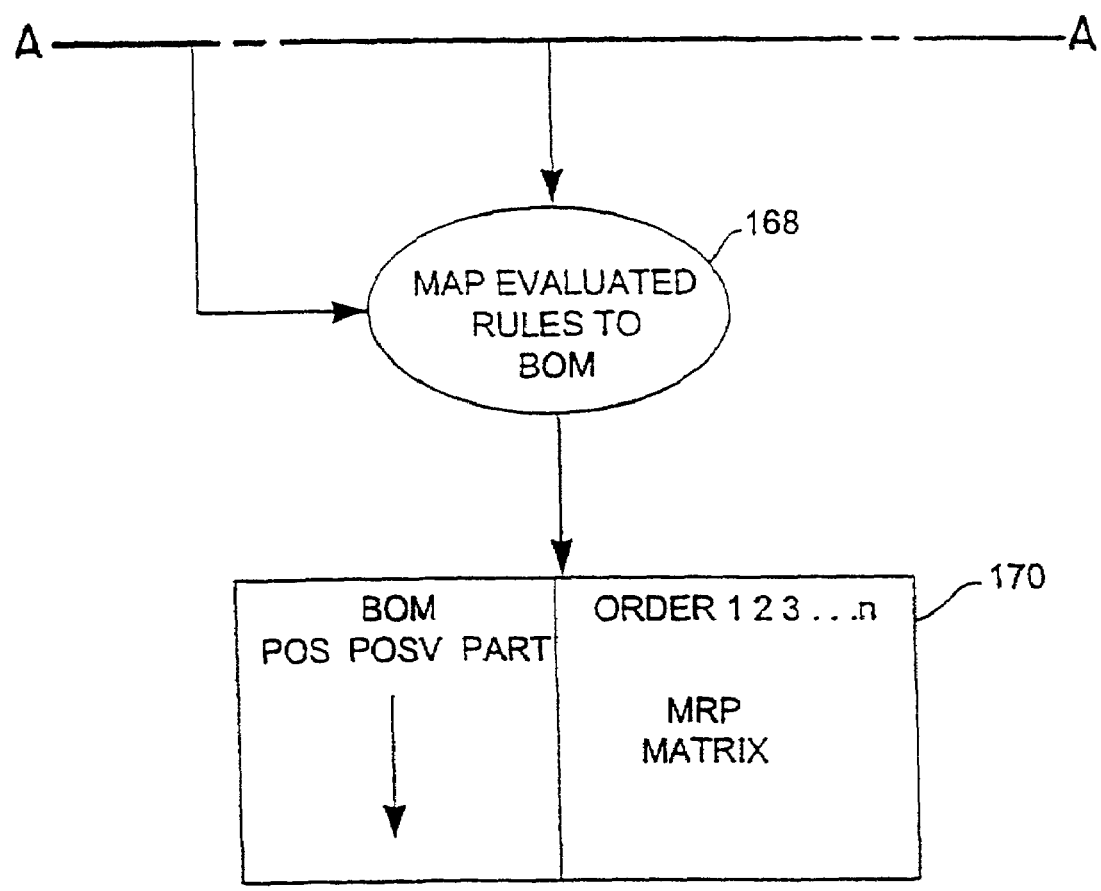

Turning to FIGS. 14a–14b, there is shown a flow diagram of a method for generating an order matrix 120. As discussed above, appropriate preprocessing of customer orders permits the use of complete code rules to identify position variants in the BOM 100, as opposed to the more complex long code rules. Such preprocessing can include several steps. When a sales order is initially generated, it typically is not in the form of a table of code rule elements 124, such as in FIG. 13. Instead, raw sales orders 140 are typically in the form of package selections, such as a "sport" or a "luxury" package, which is made up of groups of build options 122, each of which has a corresponding code rule element 124. A table of marketing code definitions 142 is used as a reference to expand a raw sales order 140 into an unvalidated sales order 146. An unvalidated sales order 146 is similar to a customer order 126, such as shown in each column of the matrix in FIG. 13, but may contain errors, such as selection of inconsistent options or failure to make required option selections.

To detect these and other errors, an unvalidated order is preferably subjected to a plausibility check (step 148) and a conflict check (step 152) and a validated order 156 is generated. The plausibility check ensures that the selected options are available for the specified model and that, as of the order date, the options have been released to the public in the designated market in accordance with availability data 150. The conflict check, made in accordance with conflict data 154, ensures that all required selections have been made, that there are no inconsistent selections, and may also verify that the selections comply with various marketing package requirements. Once a validated order 156 is available, it can be added to the order matrix 120.

Before the orders which are detailed in the order matrix 120 can be manufactured, the code rules in the BOM 100 must be evaluated to determine which position variants should be used at each of the defined positions, and thus which parts are required for each corresponding location. In conventional systems, for each order, every code rule in the BOM is evaluated in turn to determine the manufacturing parts required to fabricate the ordered car. However, this process is generally inefficient and processing times of up to several minutes per order are not uncommon.

Preferably, the code rules in the BOM 100 are evaluated using the order matrix data on a rule-by-rule basis, wherein each unique code rule in the BOM is evaluated once for each order. Most preferably, a first unique rule is evaluated for all of the orders in the order matrix before a next rule is evaluated. Then, the results are mapped back to the various code rule entries in the BOM. The preferred method of evaluating the BOM code rules is illustrated generally in FIGS. 15a–15b.

First, the entries in the BOM 100 are analyzed to identify each unique code rule statement which is used anywhere in the BOM 100 (step 160) and a code rule matrix 162 which contains these unique code rules is generated. The code rule statements in the code rule matrix 162 are each assigned a code rule ID 163, which can simply be the record or row number in the code rule matrix 162. For simplifying later reference, the code rule IDs 163 are mapped back to the individual code rule statements 104 in the BOM 100. Advantageously, while there can be a very large number of entries in the BOM, the number of unique code rules is generally only a small fraction of that total.

Preferably, the BOM 100 is stored as a table in a generalized database program and the unique code rules are extracted by sorting the rows in the BOM 100 with the code rules as a primary key and then using standard database functions to create a table which contains each distinct code rule entry only once. The specific functions required to extract the rules in this manner depend on the database being used and will be known to those of skill in the art.

Figure 16:
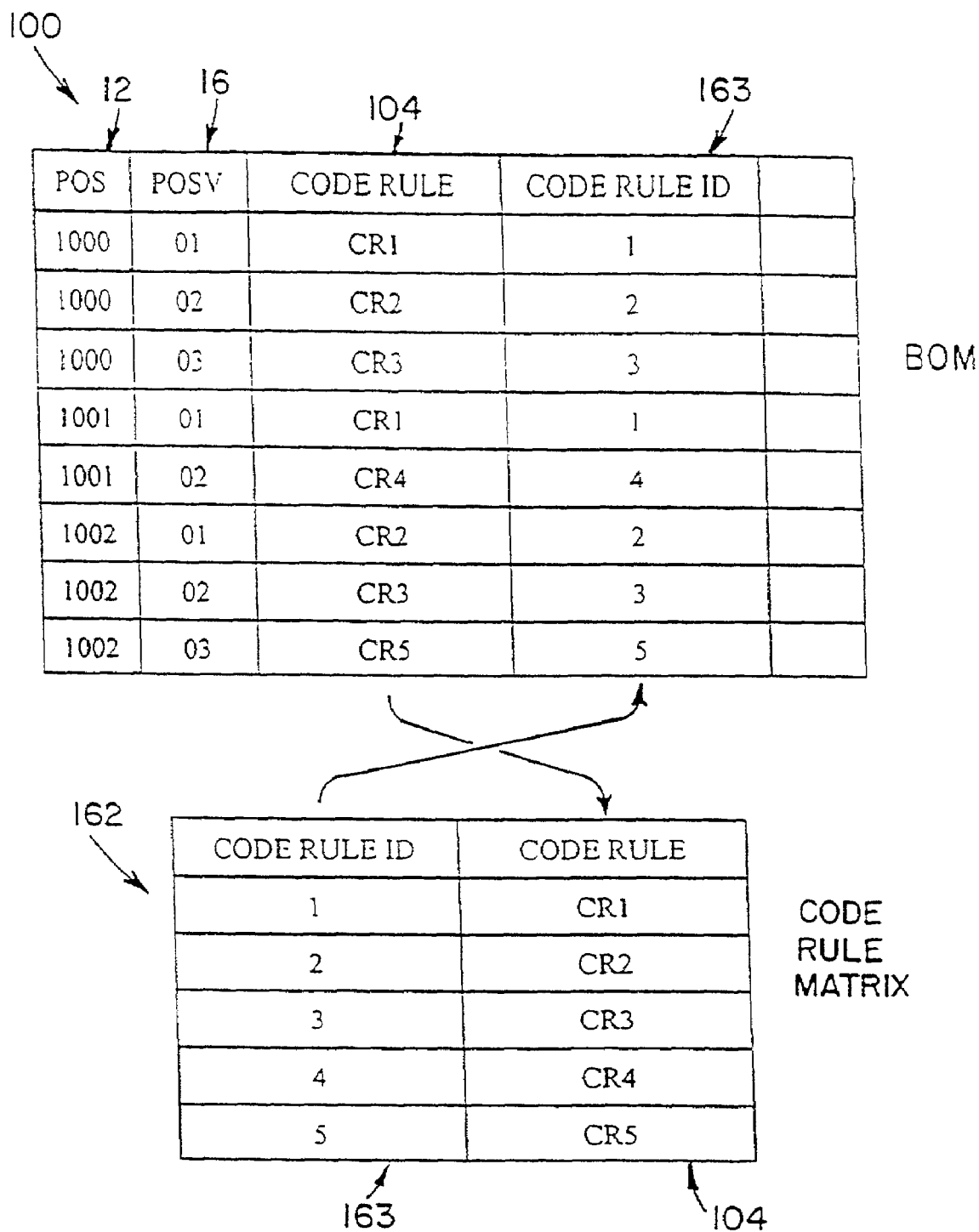
FIG. 16 is a diagram illustrating the creation of a code rule matrix from a BOM.

FIG. 16 illustrates a portion of a sample BOM 100' which contains eight position variants distributed across three positions. Each position variant has an associated code rule, e.g., CR1. As shown, the same code rule may be associated with more than one position variant. For example, position 1000, variant 1 and position 1001, variant 1 utilize code rule "CR1". The initial code rule matrix 162 derived from this BOM 100' contains only five entries, one for each unique code rule. In this example, the unique code rule ID 163 is simply the record number in the code rule matrix 162. The code rule IDs 163 are added to the BOM 100' as shown. Although in this example, a separate code rule ID column has been added to the BOM 100', the code rule ID does not need to be expressly recited in the BOM and other techniques to associate each code rule usage in the BOM with its corresponding entry in the code rule matrix 162, such as relational links, can be used instead.

Those of skill in the art will appreciate that different position variants may be valid at a given position during different periods of time. For example, a part may be discontinued or not available until a designated time period. Accordingly, each position variant code rule in the BOM 100 can have an associated validity period, generally in the form of a from-date and a to-date, the values of which indicate when the rule is valid (i.e., the variant can be selected) and when the rule is invalid (i.e., the variant cannot be selected). In a preferred embodiment, as the unique code rules are extracted, those code rules which have expired are filtered out and are not added to the code rule matrix 162. These rules may be retained in the BOM, however, and assigned a distinct rule ID which indicates that the variant has expired and the code rule need not be evaluated. The resulting code rule matrix 162 will thus contain only non-expired rules. i.e., those which are presently valid or will become so at some time in the future.

Once the code rule matrix 162 has been generated, each unique rule in the matrix 162 is then evaluated using the option data detailed in the order matrix 120 (FIGS. 15a–15b, step 164) to thereby generate an evaluated rule matrix 166 (see FIG. 17). There are a variety of methods by which the individual code rules in the code rule matrix can be evaluated. In contrast with the conventional method of evaluating all rules applicable to a specific customer order before moving on to the next customer order, preferably, each unique code rule is evaluated once in the order matrix 120 and the results stored in the evaluated rule matrix 166 before the next rule is evaluated. By evaluating a code rule once for all customer orders (regardless of how may times the code rule appears in the BOM) before evaluating a next code rule, extraction of data from the order matrix can be optimized, increasing the speed of code rule evaluation. A most preferred method of evaluating code rules in the code rule matrix is discussed in more detail below with reference to FIGS. 21a, 21b, 22–24, 25a, 25b, and 26–27.

The evaluation of each unique code rule for a given order can be represented as a single bit within a bit matrix 167 that is included within the evaluated rule matrix 166. The rule evaluation data stored in the matrix 167 is in a very compact form, requiring for m unique code rules and n orders, only m*n bits. i.e. only one bit per rule per order. An illustration of a sample evaluated rule matrix 166 containing bit matrix 167 is shown in FIG. 17.

A typical BOM for a luxury automobile can include 70,000 separate part/rule entries, but only about 4000 unique code rules. Advantageously, evaluating the code rule matrix 162 for an order matrix having 8000 orders results in a bit matrix 167 which is approximately 32 million bits in size, or approximately 3.8 megabytes. This amount of information may easily be contained within the RAM of a conventional personal computer or workstation, eliminating the need and associated delays of writing intermediate or partial results to disk.

Finally, the evaluated rule data 167 contained in the evaluated rule matrix 166 is mapped to the individual code rule statements in the BOM 100 to generate an MRP matrix 170 which indicates for each position defined in the BOM 100, which variant 16 has been selected for each order (FIGS. 15a–15b, step 168) and, preferably, how many of each part is required for the selected position variant. In most cases, only a single part will be needed and thus a hit (designated as "1") also indicates that one of the identified position variant is required for the given order in the specified position. However, especially when connector parts are at issue, a single variant may, in fact, represent several parts, such as bolts, screws, clips, etc. While each part could be separately defined in its own position, to simplify the definition of multiple parts, a part multiplier indicating how many of a part identified by a position variant is used in the associated location can be included as part of the position variant entry and this multiplier later used to determine the true number of parts required.

FIG. 18 is an illustration of such an MRP matrix 170 for the sample BOM 100' shown in FIG. 16 and the evaluated rule matrix 166 shown in FIG. 17. A more complete sample of an MRP matrix 170 is illustrated in FIGS. 19a–19b. Turning to FIG. 18, the portion 171 of the MRP matrix 170 contains the rule evaluation data for each code rule taken from the evaluated rule matrix 166, e.g., as linked by the code rule ID. As illustrated, for each order 1 . . . n, only one of the possible position variants 16 is selected at each position. For example, order 1 requires part A1 (variant 01) to be used in the location associated with position 1000 while order 2 requires part A3 to be used in that location. By adding up the parts requirements for the desired number of orders, the total number of parts required to manufacture the ordered cars can be easily and quickly determined.

In FIG. 18, the position variants associated with position 1002 each have a multiplier of eight associated with them. Thus, in order 1, eight C3 parts are used in the location corresponding to position 1002, in order 2, eight C2 parts are used, and, in order 3, eight C1 parts are used. In this example, the multiplier has been applied to each order. Alternatively, application of the position variant multiplier can be deferred until the total number of parts for a given position/variant is determined. In such a situation, the hits for variants having a multiplier greater than 1 can still be represented as "1" in the BOM. When the part totals are determined, the sum for each variant is then multiplied by the multiplier to determine the actual number of parts required. Although deferring use of the multiplier in this manner increases processing speed, it may cause additional complications since summations of the raw MRP data would no longer directly represent the total parts requirements.

As discussed above, position variants may have an associated time period within which they are valid. Code rules for expired variants can be filtered out when the code rule matrix 160 is built. However, it is possible that presently valid variants may become invalid during the manufacturing time span covered by the orders in the order matrix 120, while other variants which are not yet valid at the start of manufacturing become valid before all of the orders defined in the order matrix 120 have been manufactured. Given a time and date when manufacturing of the customer orders in the order matrix 120 is to start and knowledge about the speed and structure of the assembly line (and possibly other relevant data), the time when each particular order detailed in the order matrix 120 will enter the assembly line can be determined. If appropriate data concerning the assembly line stations is linked to the position and position variant information in the BOM, the time the parts indicated for use in accordance with the selected position variant for a given positions can also be determined.

Preferably, all rules in the code rule matrix 162 are evaluated for every order which is defined in the order matrix 120. When the evaluated rule data is mapped to the BOM (step 168), the time when a specific order enters the assembly line, and possibly when specific stations on the line are reached, is determined. This data is then used to determine whether at the particular manufacturing time for a given order, any selected variants are invalid, either because they have expired or are not yet valid. Any hits from rules determined to be invalid for a given order are prevented from being mapped into the MRP matrix 170.

Advantageously, because the evaluated rule matrix 164 contains rule evaluations for every order, even if the variant is ultimately determined to be invalid, it is possible to change the sequence of customer orders in the MRP matrix 120 without having to reevaluate the entire BOM 100, as is necessary in conventional MRP systems. If the sequence in which customer orders are listed in the order matrix 120 is changed, all that is needed to generate an updated MRP matrix 170 is to resequence the data in the evaluated rule bit matrix 166 to correspond to the resequenced order matrix 120 (e.g., by simply rearranging the data columns) and repeat the mapping of the evaluated code rules to the BOM (step 168) so that the new times when the resequenced orders will reach the various positions on the assembly line can be determined and the appropriate hits filtered out during the mapping process.

Changes in the manufacturing sequence may be necessary for many reasons, including a sudden unavailability of parts as a result of, e.g., a strike. By eliminating the need to reevaluate the code rules in response to a change in manufacturing sequence, manufacturing sequence variations can be quickly and easily analyzed, perhaps as part of an automated process, to determine the optimum sequence of manufacturing and the effect in time, cost, etc., of various sequencing options before a particular sequence is selected. Further, the changed parts requirements which may result from an order resequencing can be quickly communicated to just-in-time or real-time parts suppliers to ensure that parts requirements are met, and also can be used to route needed parts to the appropriate assembly line stations, even if the change occurs mid-stream.

Figure 20:
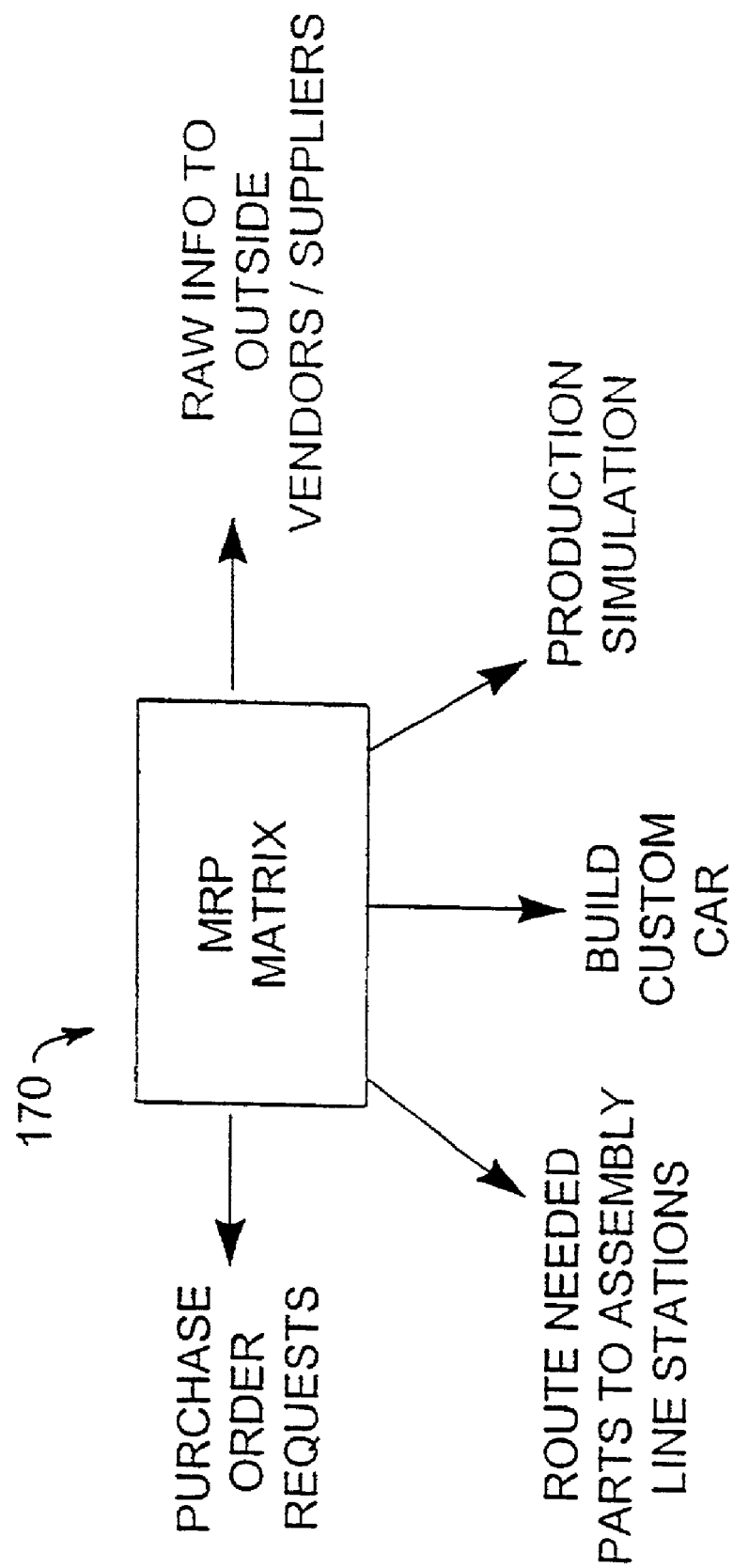
FIG. 20 illustrates various applications of MRP data.

Once the MRP matrix 170 has been generated from a BOM 100 and a group of customer orders 120, the specific types and amounts of parts and position variants required to manufacture each of the ordered cars can be determined and this data used in a wide variety of applications. (See FIG. 20.) Because, in one embodiment, each unique position in the BOM 100 can be linked to a station on the assembly line, the MRP data generated according to the above process can be used to route necessary parts to the correct stations on the assembly line so that they are present when needed and also to inform the line workers which parts to install to thereby fabricate a custom ordered car. Furthermore, the MRP data can be used to generate purchase order requests to part suppliers with sufficient accuracy to maintain a just-in-time or real-time inventory system at the manufacturing facility. Alternatively, the raw MRP data can be supplied directly to part suppliers. e.g., via the Internet, so that they can determine when parts must be supplied to the manufacturer and the volume required. In addition, the MRP data can be used to determine a wide variety of manufacturing related information, such as the actual cost to manufacture each individual order, the time required to assemble each order, the cost of implementing manufacturing changes, etc.

As discussed above, while the rules in the code rule matrix 162 can be evaluated in many ways, a novel method of evaluating the code rules so as to greatly increase the speed of evaluation has been developed. This method will be discussed with respect to the flow diagram of FIGS. 21a, 22b, and 22 and the sample data matrixes in FIGS. 23–24, 25a, 25b, and 26–27.

The fast code rule evaluation method begins with a code rule matrix 162 containing each unique code rule, such as described previously. A sample code rule matrix 162 containing four separate code rules is illustrated in FIG. 23. As discussed above, the components used to construct the code rules correspond to the code rule elements 124 used in the order matrix 120. Thus, for example, the code rule "10500" in FIG. 23 is "(245+551)·M154". With reference to the data in the sample order matrix illustrated in FIG. 13, code rule 10500 is true for a particular order if the customer has selected a 6-cylinder engine (code "M154") and either or both of a trip computer (code "245") and an alarm (code "551") are also selected.

Figure 21A:
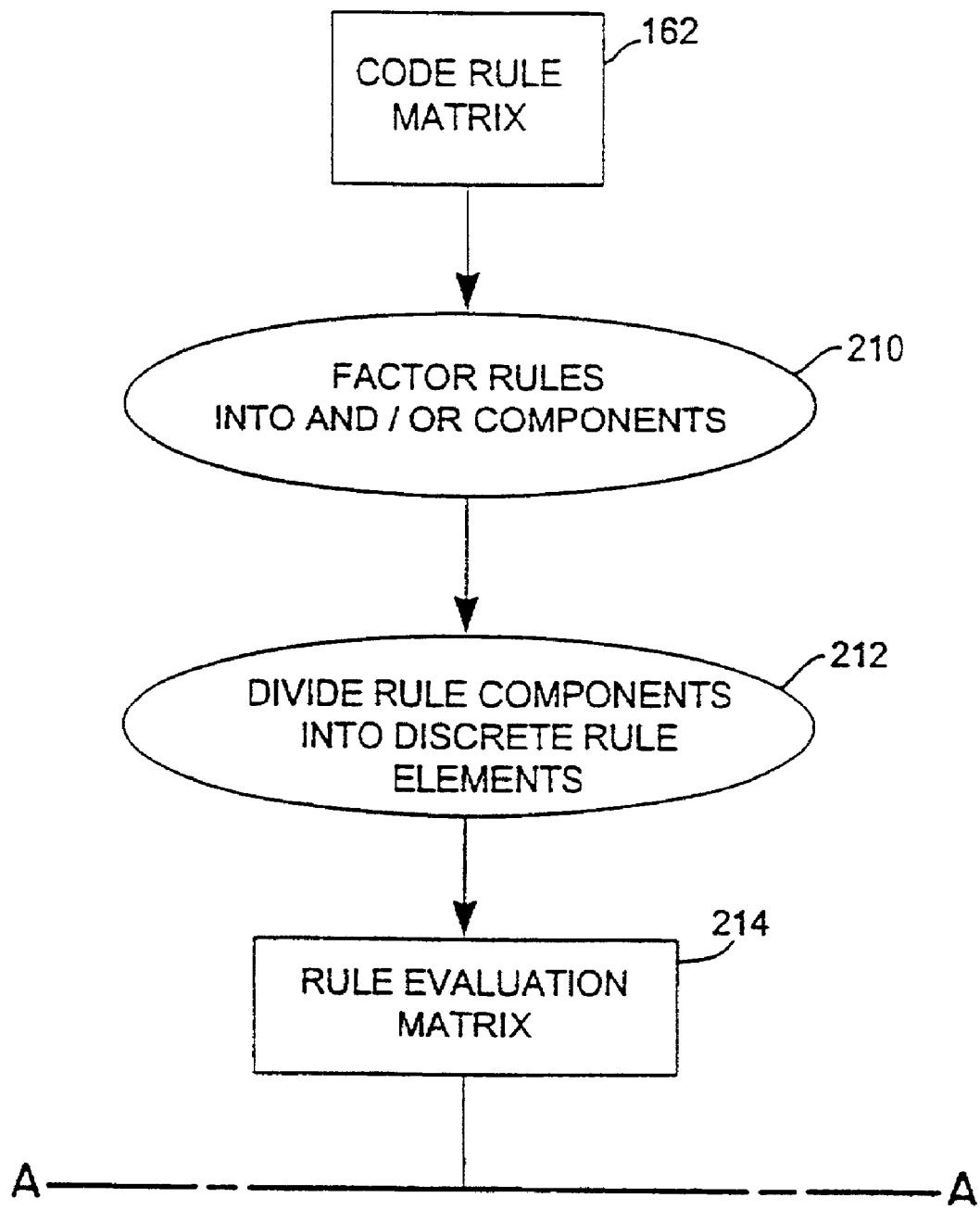

Once the code rule matrix 162 is provided, each unique code rule is then broken down into its constituent code rule elements 124 which are stored in an intermediate rule evaluation matrix (see FIGS. 25a–25b). For example, the logical code rule elements 124 of the code rule "(245+551)· M154" are "245", "551", and "M154". Although the code rule elements 124 can be extracted directly from the original code rule, preferably, complex code rules (i.e., those which contain both AND and OR operators), are first divided into simpler logical operations which contain only a single type of logical operator (step 210) and these simpler components are then further broken into individual code rule elements (FIGS. 21a–21b, step 212).

A simplifying breakdown of the code rules in FIG. 23 is shown in the intermediate matrix 240 illustrated in FIG. 24. The sample source code rule "(245+551)·M154" of row 244 (rule ID 10500) has been divided into two simpler rule components, "245·M154" (row 246) and "551·M154" (row 248) according to the distributive property of boolean equations, thus eliminating the "OR" operator.

Once a code rule has been broken down into simplified code rule components, the original code rule can be evaluated by first evaluating each of the derived simplified rule components and then combining the results appropriately. In this example, the code rule "(245+551)·M154" (row 244) is true if either of the derivative simplified rule components "245·M154" and "551·M154" (rows 246, 248) is true.

Alternatively, simplified rule components can be derived which eliminate the "AND" operator. In this example, the components would be "245+551" and M154. In such a case, the source code rule would be true only if both of the simplified rule components are true. The selection of whether to simplify code rules by eliminating AND operators or eliminating OR operators is dependent to some extent on the complexity of the code rules. Preferably, the selected simplification method is chosen in order to minimize the number of simplified rule components which are generated. In the present example, all simplified components result from elimination of the OR operators. However, in practice, some simplified rules can be generated from OR elimination while others are generated from AND elimination.

The code rule and the derived simpler components (rows 244–248) can all be considered part of the same code rule record 242, and thus are assigned the same code rule ID. To distinguish the simplified rule components from the original unique code rules, the entries can be given different classes 252, i.e., class "V" and "C" respectively. Alternatively, or in conjunction, a numeric designation "CV2" 250 can be provided in which a code rule has value zero and the simplified components are numbered sequentially as shown.

After the simplified code rule components are generated for a given code rule, the rule components are further divided into discrete code rule elements 124. FIGS. 25a–25b show rule evaluation matrix 214 as it appears after all the code rules have been simplified and expanded. For example, code rule component 246 is divided into the discrete elements "245" and "M154" (rows 256 and 258) and code rule component 248 is divided into the discrete elements "551" and "M154" (rows 260 and 262). These atomic code rule elements can be distinguished from simplified components and the original code rules by an appropriate class 252 designation, such as "A". In addition, or alternatively, a second numeric designation "CV3" 254 can be used, wherein each simplified component has a CV3 value of zero and the associated code rule elements have a CV3 value which is numbered sequentially.

Once the rule evaluation matrix 214 has been generated, the code rules in the matrix 214 are evaluated for each customer order using the data from the order matrix 120. A discrete code rule element can be evaluated for every order very quickly and with minimal computing overhead simply by linking each discrete rule element record in the rule evaluation matrix 214 (i.e. class "A" records) to the customer order data in the row in the order matrix 120 which contains the same discrete rule element (FIGS. 21a–21b, step 216). Advantageously, this technique eliminates any need to directly access data stored in the order matrix 120 for any particular customer order. Rather, each discrete code rule element is evaluated for all customer orders by the establishment of a single link.

Figure 26:
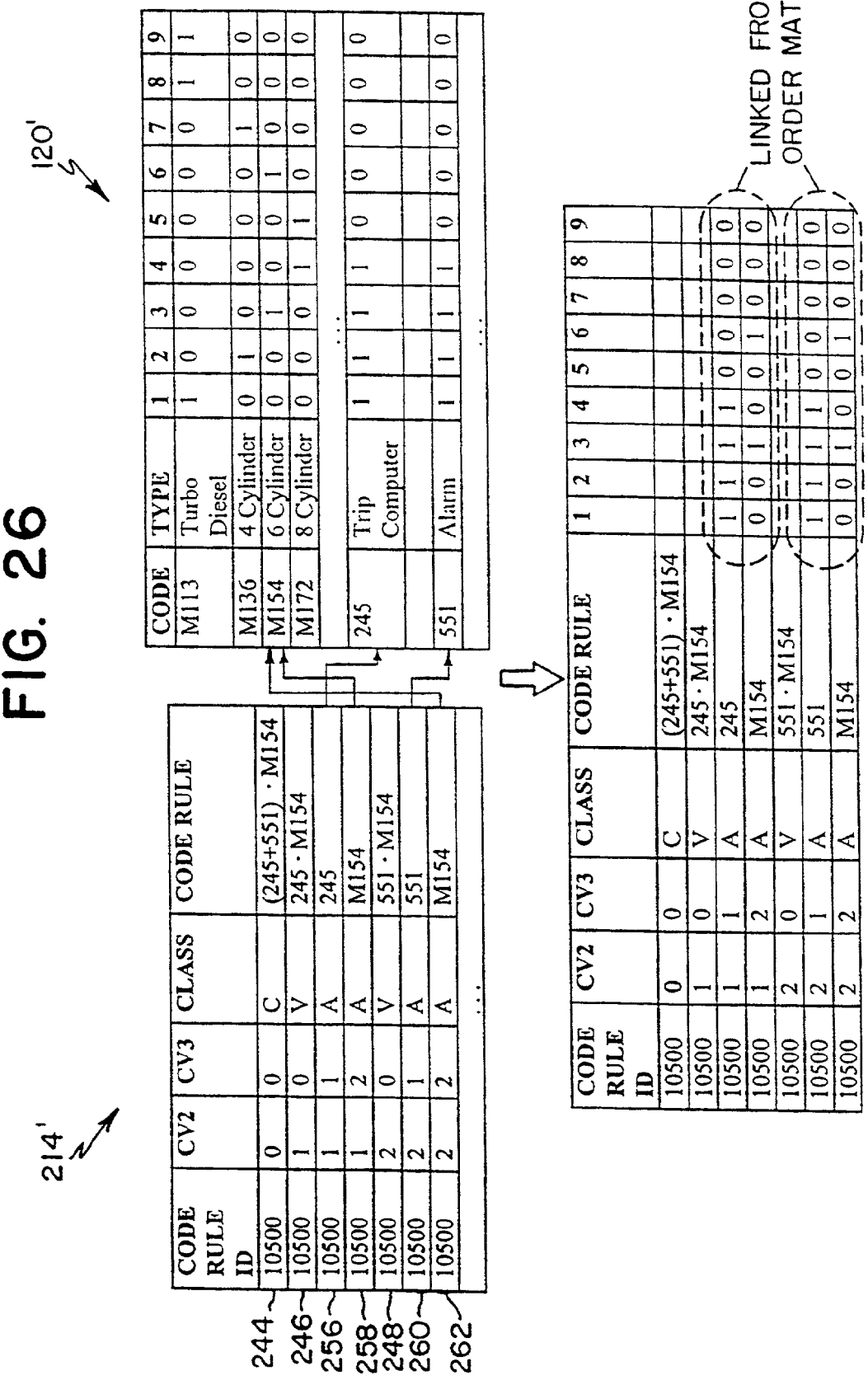
FIG. 26 illustrates linking of data between an intermediate rule evaluation matrix and the order matrix.

FIG. 26 illustrates this technique with a portion 214' of the intermediate rule evaluation matrix 214 of FIGS. 25a–25b and a corresponding portion 120' of the order matrix 120 of FIG. 13. As shown, row 256 of rule evaluation matrix 214' contains code rule element "245". This entry is linked to the data in row 266 in the order matrix 120', which data indicates for each of the customer orders whether that option has been selected. The resulting partially evaluated matrix can be visualized as an intermediate matrix 269 as shown in FIG. 26. Although the data rows from the order matrix 120' can be copied into an intermediate matrix, such as matrix 269, the data at this level is not modified during the rule evaluation and therefore copying is an unnecessary use of system resources, both in execution time and memory utilization. However, for the purposes of clarity, the order matrix data will be illustrated as if it were directly copied.

Once the order matrix data has been linked to the discrete rule element entries in the rule evaluation matrix 214, the simplified code rule components are evaluated with reference to the linked values of the discrete code rule elements (FIGS. 21a–21b, step 218) and then the unique code rules themselves are evaluated with reference to the evaluation of the simplified code rule components (FIG. 22, step 220).

Advantageously, because each of the simplified code rule components contains only a single logical operator, each component can be easily evaluated for every order by simply summing the binary data for that order linked to each of the discrete code rule elements. In other words, addition can be used as a simple substitute for performing direct logical evaluations. When the simplified rule component is based on only AND operations, the simplified code rule component is true if the resulting sum is equal to the number of discrete rule elements it contains. When the simplified rule component is based on only OR operations the simplified code rule component is true if the resulting sum is greater than zero.

A special case exists when a rule includes a NOT operator, i.e., a code rule such as "(245+551)·–M154". In one implementation, the NOT operation, as applied to a discrete rule element, is implemented by inverting the data in the linked order matrix row when it is referenced. Alternatively, when a discrete code rule element is to be inverted, true binary data values linked from the order matrix 120 are not considered to have a value of one, but instead are assigned a negative value which is sufficiently large (e.g., –9) to ensure that the generated sum can be properly interpreted when evaluating the simplified code rule element using addition.

FIG. 27 is an illustration of an evaluated rule matrix 166 showing a single fully evaluated code rule in accordance with the intermediate matrix 269 shown in FIG. 26 and using addition to evaluate the simplified code rule components. As discussed above, order data for the discrete code rule elements (rows 256, 258, 260, and 262) are directly linked from the corresponding data rows in the order matrix 120. In this example, simplified rule component "245·M154" (row 246) is defined to have a value for each order 1 . . . n which is the sum of the values in each code rule element (rows 256, 258) for the respective order. Thus, the value of simplified rule component "245·M154" for order 1 is the sum 1+0=1. The value of this component for order 3 is the sum 1+1=2. Because the simplified rule component is an AND-only rule with two elements, the component is true only when the sum of the discrete rule element values equals 2. In this example, the simplified component is only true for order 3. The second simplified component (row 248) is evaluated similarly and is also true only for order 3. Once the simplified rule components are evaluated, the results are logically combined to evaluate the original code rule. Here, code rule 10500 (row 244) is valid only for order 3.

As can be appreciated, using the above technique, each unique code rule is essentially evaluated for all orders in the order matrix 120 in parallel. The use of simplified code rule components allows some or all of the evaluation to be by simple addition operations. Although the individual additions must still be performed, conventional database programs are generally written to allow the value of one data row to be dependent on a mathematical combination of the values in other rows. Thus, this evaluation method can easily be integrated as a spreadsheet-type formula associated with each of the simplified rule component rows (e.g., row 246=(row 256)+(row 258)). In addition, the intermediate evaluations may be performed very quickly.

It should be noted that while logical evaluation by addition is a preferred method of implementation, due to its ease of implementation in a spread-sheet type database system, the invention is not so limited. Thus, for example, the simplified code rule components can be evaluated directly as logical statements applied to appropriate bit matrixes, either within the database program itself, or by use of an external computer program (written in, e.g., "C" or assembly language), which program is passed the appropriate data matrixes as arguments.

After all of the individual code rules have been evaluated, the results are then linked, copied, or otherwise mapped to the BOM 100 using the code rule IDs to thereby generate an MRP matrix 170 which indicates, for each customer order, which position variant is to be used at each defined position.

The simplified and parallel rule evaluation of the present invention permits an MRP analysis to be performed at speeds several orders of magnitude faster than conventional techniques. While a conventional MRP process may take upwards of 100 hours to evaluate a 70,000 entry BOM for 8000 separate customer orders, a complete MRP evaluation using a system operated according to the invention can be performed in substantially less than one hour and an MRP for a resequenced order matrix can be generated in a matter of seconds.

It should be noted that while the various matrixes have been described above as being separate from each other, it is understood that they can be combined into one or more larger matrixes and data for the various rows and columns filled in as needed. Further, while the matrix representation is the preferred format, other data storage methods can also be used as appropriate for the particular computer operating environment at issue.

Once a code rule has been broken down into simplified code rule components, the original code rule can be evaluated by first evaluating each of the derived simplified rule components and then combining the results appropriately. In this example, the code rule "(245+551)·M154" (row 244) is true if either of the derivative simplified rule components "245·M154" and "551·M154" (rows 246, 248) is true.

Alternatively, simplified rule components can be derived which eliminate the "AND" operator. In this example, the components would be "245+551" and M154. In such a case, the source code rule would be true only if both of the simplified rule components are true. The selection of whether to simplify code rules by eliminating AND operators or eliminating OR operators is dependent to some extent on the complexity of the code rules. Preferably, the selected simplification method is chosen in order to minimize the number of simplified rule components which are generated. In the present example, all simplified components result from elimination of the OR operators. However, in practice, some simplified rules can be generated from OR elimination while others are generated from AND elimination.

The code rule and the derived simpler components (rows 244–248) can all be considered part of the same code rule record 242, and thus are assigned the same code rule ID. To distinguish the simplified rule components from the original unique code rules, the entries can be given different classes 252, i.e., class "V" and "C" respectively. Alternatively, or in conjunction, a numeric designation "CV2" 250 can be provided in which a code rule has value zero and the simplified components are numbered sequentially as shown.

After the simplified code rule components are generated for a given code rule, the rule components are further divided into discrete code rule elements 124. FIG. 25 shows rule evaluation matrix 214 as it appears after all the code rules have been simplified and expanded. For example, code rule component 246 is divided into the discrete elements "245" and "M154" (rows 256 and 258) and code rule component 248 is divided into the discrete elements "551" and "M154" (rows 260 and 262). These atomic code rule elements can be distinguished from simplified components and the original code rules by an appropriate class 252 designation, such as "A". In addition, or alternatively, a second numeric designation "CV3" 254 can be used, wherein each simplified component has a CV3 value of zero and the associated code rule elements have a CV3 value which is numbered sequentially.

Once the rule evaluation matrix 214 has been generated, the code rules in the matrix 214 are evaluated for each customer order using the data from the order matrix 120. A discrete code rule element can be evaluated for every order very quickly and with minimal computing overhead simply by linking each discrete rule element record in the rule evaluation matrix 214 (i.e., class "A" records) to the customer order data in the row in the order matrix 120 which contains the same discrete rule element (FIG. 21, step 216). Advantageously, this technique eliminates any need to directly access data stored in the order matrix 120 for any particular customer order. Rather, each discrete code rule element is evaluated for all customer orders by the establishment of a single link.

FIG. 26 illustrates this technique with a portion 214' of the intermediate rule evaluation matrix 214 of FIG. 25 and a corresponding portion 120' of the order matrix 120 of FIG. 13. As shown, row 256 of rule evaluation matrix 214' contains code rule element "245". This entry is linked to the data in row 266 in the order matrix 120', which data indicates for each of the customer orders whether that option has been selected. The resulting partially evaluated matrix can be visualized as an intermediate matrix 269 as shown in FIG. 26. Although the data rows from the order matrix 120' can be copied into an intermediate matrix, such as matrix 269, the data at this level is not modified during the rule evaluation and therefore copying is an unnecessary use of system resources, both in execution time and memory utilization. However, for the purposes of clarity, the order matrix data will be illustrated as if it were directly copied.

Once the order matrix data has been linked to the discrete rule element entries in the rule evaluation matrix 214, the simplified code rule components are evaluated with reference to the linked values of the discrete code rule elements (FIG. 21, step 218) and then the unique code rules themselves are evaluated with reference to the evaluation of the simplified code rule components (FIG. 22, step 220).

Advantageously, because each of the simplified code rule components contains only a single logical operator, each component can be easily evaluated for every order by simply summing the binary data for that order linked to each of the discrete code rule elements. In other words, addition can be used as a simple substitute for performing direct logical evaluations. When the simplified rule component is based on only AND operations, the simplified code rule component is true if the resulting sum is equal to the number of discrete rule elements it contains. When the simplified rule component is based on only OR operations, the simplified code rule component is true if the resulting sum is greater than zero.

A special case exists when a rule includes a NOT operator, i.e., a code rule such as "(245+551)·−M154". In one implementation, the NOT operation, as applied to a discrete rule element, is implemented by inverting the data in the linked order matrix row when it is referenced. Alternatively, when a discrete code rule element is to be inverted, true binary data values linked from the order matrix 120 are not considered to have a value of one, but instead are assigned a negative value which is sufficiently large (e.g., −9) to ensure that the generated sum can be properly interpreted when evaluating the simplified code rule element using addition.

FIG. 27 is an illustration of an evaluated rule matrix 166 showing a single fully evaluated code rule in accordance with the intermediate matrix 269 shown in FIG. 26 and using addition to evaluate the simplified code rule components. As discussed above, order data for the discrete code rule elements (rows 256, 258, 260, and 262) are directly linked from the corresponding data rows in the order matrix 120. In this example, simplified rule component "245·M154" (row 246) is defined to have a value for each order 1 . . . n which is the sum of the values in each code rule element (rows 256, 258) for the respective order. Thus, the value of simplified rule component "245·M154" for order 1 is the sum 1+0=1. The value of this component for order 3 is the sum 1+1=2. Because the simplified rule component is an AND-only rule with two elements, the component is true only when the sum of the discrete rule element values equals 2. In this example, the simplified component is only true for order 3. The second simplified component (row 248) is evaluated similarly and is also true only for order 3. Once the simplified rule components are evaluated, the results are logically combined to evaluate the original code rule. Here, code rule 10500 (row 244) is valid only for order 3.

As can be appreciated, using the above technique, each unique code rule is essentially evaluated for all orders in the order matrix 120 in parallel. The use of simplified code rule components allows some or all of the evaluation to be by simple addition operations. Although the individual additions must still be performed, conventional database programs are generally written to allow the value of one data row to be dependent on a mathematical combination of the values in other rows. Thus, this evaluation method can easily be integrated as a spreadsheet-type formula associated with each of the simplified rule component rows (e.g., row 246=(row 256)+(row 258)). In addition, the intermediate evaluations may be performed very quickly.

It should be noted that while logical evaluation by addition is a preferred method of implementation, due to its ease of implementation in a spread-sheet type database system, the invention is not so limited. Thus, for example, the simplified code rule components can be evaluated directly as logical statements applied to appropriate bit matrixes, either within the database program itself, or by use of an external computer program (written in, e.g., "C" or assembly language), which program is passed the appropriate data matrixes as arguments.

After all of the individual code rules have been evaluated, the results are then linked, copied, or otherwise mapped to the BOM 100 using the code rule IDs to thereby generate an MRP matrix 170 which indicates, for each customer order, which position variant is to be used at each defined position.

The simplified and parallel rule evaluation of the present invention permits an MRP analysis to be performed at speeds several orders of magnitude faster than conventional techniques. While a conventional MRP process may take upwards of 100 hours to evaluate a 70,000 entry BOM for 8000 separate customer orders, a complete MRP evaluation using a system operated according to the invention can be performed in substantially less than one hour and an MRP for a resequenced order matrix can be generated in a matter of seconds.

It should be noted that while the various matrixes have been described above as being separate from each other, it is understood that they can be combined into one or more larger matrixes and data for the various rows and columns filled in as needed. Further, while the matrix representation is the preferred format, other data storage methods can also be used as appropriate for the particular computer operating environment at issue.

What is claimed is:

1. A method, for manufacturing an article of manufacture having a plurality of structural design variants in accordance with at least one order specifying particular design options, the article of manufacture being described in a bill of materials BOM containing a plurality of position variant definitions, each position variant definition being assigned to a particular position corresponding to a physical location in the article of manufacture, each position variant definition further identifying a specific part and including a code rule indicating when the identified part should be used at the location corresponding to the particular position, each code rule being a logical statement including one or more unique code rule elements; the method comprising the steps of:

extracting unique code rules from the BOM;

evaluating each unique code rule in accordance with the design options for each order;

mapping the evaluations of the unique code rules to the corresponding code rules in the position variant definitions in the BOM;

determining the appropriate position variant for each position in accordance with the mapped code rule evaluations; and manufacturing the article of manufacture based on the determined position variants for the respective particular positions corresponding to the respective physical locations in the article of manufacture, wherein:

each code rule comprises at least one code rule element corresponding to a selectable design option; and the orders are contained in an order matrix which cross references each order against every code rule element, wherein each position variant definition has an associated validity period and the step of extracting unique code rules comprises extracting unique code rules only from those position variant definitions which have not expired at a specified start time based on the validity period, wherein a sequence of orders in the order matrix indicates a time sequence of manufacture, the method further comprising the steps of determining, in accordance with the specified start time, a build time when the article of manufacture associated with each particular order will be manufactured; and the step of mapping comprising mapping the evaluations of the unique code rules to the corresponding code rules in the position variant definitions only for those particular orders which have a build time within the validity period of the respective position variant.

2. A system for manufacturing an article of manufacture having a plurality of structural design variants, the system comprising:

a computer having a processor and a memory;

the memory including information representing a bill of materials BOM containing a plurality of position variant definitions, each position variant definition being assigned to a particular position corresponding to a location in the article of manufacture, each position variant definition further identifying a specific part, and including a code rule indicating when the position variant definition should be selected and thereby when the identified part should be used at the corresponding location;

the memory further including information representing at least one order specifying particular design options which define a particular design variant of the article;

wherein each code rule for a particular design variant is a logical statement including one or more unique code rule elements;

the processor being configured to:

(a) extract unique code rules from the BOM and evaluate the code rules for each position variant definition in accordance with the respective design options for each order to identify an appropriate part for use in each location of the corresponding particular design variant of the article; and (b) produce an output indicating for each order the appropriate parts for use in the corresponding particular design variant of the article;

the particular design variant defined by a specific order corresponding to the article of manufacture using the parts indicated for that specific order;

wherein the processor is configured to evaluate the code rules by:

mapping the evaluations of the unique code rules to the corresponding code rules in the position variant definitions in the BOM; and determining the appropriate position variant for each position in accordance with the mapped code rule evaluations;

wherein each position variant definitions has an associated validity period; and the processor is configured to extract unique code rules only from those position variant definitions which are not expired at a specified start time in accordance with the associated validity period;

wherein:

the orders are contained in an order matrix stored in memory wherein the sequence of orders in the order matrix indicates a time sequence of manufacture of said orders;

the processor being further configured to:

determine, in accordance with the specified start time, a build time when the article of manufacture associated with each particular order will be manufactured;

map the evaluations of the unique code rules to the corresponding code rules in the position variant definitions only for those particular orders which have a build time within the validity period of the respective position variants; and control the manufacturing of the article based on the determined position variants for the respective particular positions corresponding to the respective physical locations in the article of manufacture.

3. A programmable medium containing a computer program configured for determining manufacturing parts requirements to produce an article of manufacture having a plurality of structural design variants in accordance with at least one order specifying particular design options, the article of manufacture being described in a bill of materials BOM containing a plurality of position variant definitions, each position variant definition being assigned to a particular position corresponding to a location in the article of manufacture, each position variant definition further identifying a specific part and including a code rule indicating when the identified part should be used at the location corresponding to the associated position, the computer program when executed performing the following steps:

extracting unique code rules from the BOM;

evaluating each unique code rule in accordance with the design options for each order;

mapping the evaluations of the unique code rules to the corresponding code rules in the position variant definitions in the BOM;

determining the appropriate position variant to select for each position in accordance with the mapped code rule evaluations, wherein each code rule comprises at least one code rule element corresponding to a selectable design option and the orders are contained in an order matrix which cross references each order against the code rule elements; and controlling the manufacturing of the article of manufacture based on the determined position variants for the respective particular positions corresponding to the respective physical locations in the article of manufacture, wherein each position variant definition has an associated validity period and the program module extracting unique code rules comprises a program module for extracting unique code rules only from those position variant definition which have not expired at a specified start time in accordance with the validity period, wherein a sequence of orders in the order matrix indicates a time sequence of manufacture of said orders, wherein the computer program further comprises the steps of:

determining, in accordance with the specified start time, a build time when the article of manufacture associated with each particular order will be manufactured; and mapping the evaluations of the unique code rules to the corresponding code rules in the position variant definitions only for those particular orders which have a build time within the validity period of the respective position variant definition.

* * * * *